United States Patent
Sunaoshi et al.

(10) Patent No.: US 12,545,798 B2
(45) Date of Patent: Feb. 10, 2026

(54) WATER-BASED INKJET INK AND PRINTED MATTER

(71) Applicants: artience Co. Ltd., Tokyo (JP); TOYOCOLOR CO., LTD., Tokyo (JP)

(72) Inventors: Kazushi Sunaoshi, Tokyo (JP); Takanori Nomura, Tokyo (JP); Riho Morita, Tokyo (JP)

(73) Assignees: artience Co. Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 18/871,525

(22) PCT Filed: Mar. 21, 2024

(86) PCT No.: PCT/JP2024/011149
§ 371 (c)(1),
(2) Date: Dec. 4, 2024

(87) PCT Pub. No.: WO2024/247451
PCT Pub. Date: Dec. 5, 2024

(65) Prior Publication Data
US 2025/0171651 A1    May 29, 2025

(30) Foreign Application Priority Data

May 31, 2023    (JP) .................. 2023-089969

(51) Int. Cl.
*C09D 11/38* (2014.01)
*C09D 11/033* (2014.01)

(52) U.S. Cl.
CPC ............ *C09D 11/38* (2013.01); *C09D 11/033* (2013.01)

(58) Field of Classification Search
CPC .............................. C09D 11/38; C09D 11/033
See application file for complete search history.

(56) References Cited

U.S. PATENT DOCUMENTS

| | | | | |
|---|---|---|---|---|
| 6,051,057 A * | 4/2000 | Yatake | .............. | C09D 11/30 106/31.86 |
| 2003/0097960 A1 * | 5/2003 | Ito | .............. | C09D 11/30 106/31.86 |
| 2007/0003715 A1 | 1/2007 | Tsubaki et al. | | |
| 2008/0010772 A1 * | 1/2008 | Kong | .............. | C11D 3/48 15/209.1 |
| 2008/0152877 A1 * | 6/2008 | Mukai | .............. | C09D 11/30 427/466 |
| 2019/0077978 A1 | 3/2019 | Suzuki et al. | | |
| 2019/0100672 A1 * | 4/2019 | Mizutani | .............. | C09D 11/033 |
| 2021/0388224 A1 * | 12/2021 | Mizushima | .............. | C09D 11/102 |
| 2021/0395546 A1 * | 12/2021 | Fukui | .............. | B41J 2/01 |

FOREIGN PATENT DOCUMENTS

| | | | | |
|---|---|---|---|---|
| JP | 11-80639 A | | 3/1999 | |
| JP | 2001215690 A | * | 8/2001 | .......... C07C 43/178 |
| JP | 2002-285055 A | | 10/2002 | |
| JP | 2003-313480 A | | 11/2003 | |
| JP | 2004181760 A | * | 7/2004 | |
| JP | 2004261679 A | * | 9/2004 | |
| JP | 2004-277562 A | | 10/2004 | |
| JP | 2004-346159 A | | 12/2004 | |
| JP | 2005146159 A | * | 6/2005 | |
| JP | 2009001815 A | * | 1/2009 | |
| JP | 2012-211260 A | | 11/2012 | |
| JP | 2017-165809 A | | 9/2017 | |
| JP | 2020037101 A | * | 3/2020 | .......... C09B 67/0033 |
| JP | 2023069331 A | * | 5/2023 | ............... B41J 2/01 |
| WO | 2023/171455 A1 | | 9/2023 | |
| WO | WO-2024121408 A1 | * | 6/2024 | ............. C09D 11/10 |

OTHER PUBLICATIONS

English machine translation of JP-2004261679-A (Year: 2004).*
English machine translation of JP-2023069331-A (Year: 2023).*
English machine translation of JP-2020037101-A (Year: 2020).*
English machine translation of JP-2009001815-A (Year: 2009).*
English machine translation of JP-2005146159-A (Year: 2005).*
English machine translation of JP-2004181760-A (Year: 2004).*
English machine translation of JP-2001215690-A (Year: 2001).*
Japanese Office Action Notice of Reasons for Refusal for JP 2023-089969 dated Nov. 6, 2023.
International Search Report for PCT/JP2024/011149 dated May 14, 2024 (PCT/ISA/210).
Written Opinion for PCT/JP2024/011149 dated May 14, 2024 (PCT/ISA/237).

* cited by examiner

*Primary Examiner* — Amber R Orlando
*Assistant Examiner* — Jeffrey Eugene Barzach
(74) *Attorney, Agent, or Firm* — Sughrue Mion, PLLC

(57) ABSTRACT

A water-based inkjet ink comprising a pigment, a surfactant (A), and a water-soluble organic solvent (B), in which the surfactant (A) includes an acetylenediol surfactant (A1) having an ethylene oxide structure and a propylene oxide structure, and having an HLB value of 10 or less; the water-soluble organic solvent (B) includes an alkanediol (B1) having 3 to 5 carbon atoms, and a glycol monoether (B2) having 4 to 10 carbon atoms; and a mass ratio ((B1)/(B2)) between a content of the alkanediol (B1) having 3 to 5 carbon atoms and a content of the glycol monoether (B2) having 4 to 10 carbon atoms is 0.8 to 12.

3 Claims, No Drawings

WATER-BASED INKJET INK AND PRINTED MATTER

CROSS REFERENCE TO RELATED APPLICATIONS

This application is a National Stage of International Application No. PCT/JP2024/011149 filed Mar. 21, 2024, claiming priority based on Japanese Patent Application No. 2023-089969 filed May 31, 2023.

TECHNICAL FIELD

Embodiments of the present invention relate to a water-based inkjet ink and printed matter formed using the water-based inkjet ink.

BACKGROUND ART

With the trend towards smaller lot sizes and diversifying needs in printing, the spread of digital printing methods is rapidly progressing. As digital printing methods do not require plates, they can be used for small lots, reduce costs and make the size of the printing device smaller.

An inkjet printing method is a type of digital printing method. In an inkjet printing method, fine droplets of ink are made to fly and land on a printing substrate (hereinafter also referred to simply as "substrate") from an inkjet head to form images and/or characters on the printing substrate. Hereinafter, the printing substrate and the images and/or characters formed by printing ink on the printing substrate are collectively referred to as "printed matter". The term "image" includes seamless images such as solid images, and checkerboard pattern images. The inkjet printing method is superior to other digital printing methods in terms of the size and cost of the printing devices, the running cost of printing, and the ease of full-color printing. In recent years, the use of the inkjet printing method has also been increasing in industrial printing applications.

The inks used in the inkjet printing method are diverse, including oil-based, solvent-based, active energy ray-curable, and aqueous inks. Solvent-based and active energy ray-curable inks have been used in industrial printing applications. However, in recent years, the demand for aqueous inks (inks containing water as a main component) has been increasing in consideration of and in response to harmful effects to the environment and people.

In recent years, there has been a growing demand for aqueous inks used in the inkjet printing method (also referred to herein as "water-based inkjet ink") to be used in packaging applications such as paper containers, labels, and packaging films. In such packaging applications, there is a need for an ink capable of producing printed matter, which has high color reproducibility and print quality even on impermeable substrates as well as on poorly permeable substrates such as coated paper and art paper, and which has characteristics that can withstand actual use. Impermeable substrates include, for example, polypropylene film (for example, biaxially oriented polypropylene (OPP) film), polyethylene terephthalate (PET) film, and nylon film.

Most of the water-based inkjet inks that have been put into practical use have been used for printing on highly permeable substrates such as plain paper and special paper. When such a water-based inkjet ink, especially a water-based inkjet ink that has not undergone any operation described below, is used as an impermeable substrate, the droplets landed on the substrate, and being in a state with a high surface tension do not spread to wet the substrate. When the droplets come into contact with adjacent water-based inkjet ink droplets in this state, a force acts on each droplet in a direction to reduce the surface area, and beading occurs. Beading is a phenomenon in which water-based inkjet ink droplets attract to each other to be combined on a printing substrate, resulting in the appearance of beaded color shades. The print quality of printed matter in which beading occurs is significantly reduced.

In addition, when printing on an impermeable substrate, the water-based inkjet ink does not penetrate into the substrate to be absorbed, resulting in insufficient drying of the landed droplets and insufficient adhesion to the substrate. As a result, when the printed matter is stored in a wound or stacked state, pressure is applied to the printing surface, and blocking occurs. Blocking is a phenomenon in which a part of an ink layer comes off with the printing substrate when the printing substrate adhering to the ink layer is peeled off.

As a method of improving print quality and blocking resistance (suppressing the occurrence of blocking), it is common to reduce the surface tension of water-based inkjet inks. For example, surfactants or water-soluble organic solvents are added to water-based inkjet inks to reduce the surface tension. However, in general, the time between the landing of a droplet of water-based inkjet ink on a printing substrate and the landing of another droplet on an adjacent position is only several hundred microseconds to several tens of milliseconds. Therefore, the droplets of water-based inkjet inks cannot sufficiently spread to wet simply by using the above-described method and reducing the static surface tension. As a result, the droplets come into contact with each other while the surface tension remains high, and beading occurs.

For example, Patent Literature 1 discloses a water-based inkjet ink in which the dynamic surface tension is controlled by using a polyoxyethylene alkyl ether surfactant. It further discloses that the water-based inkjet ink suppresses feathering (a phenomenon in which irregular bleeding of water-based inkjet ink occurs along fibers of a printing substrate such as fine paper) or the like to obtain printed matter having excellent print quality, and it also can suppress deterioration in ejection stability. It is true that the water-based inkjet ink is effective for improving print quality on a permeable substrate as used in the embodiment of Patent Literature 1. However, when the water-based inkjet ink is used for printing on a non-permeable substrate, beading occurs because droplets come into contact with each other without being sufficiently spread to wet.

Patent Literature 2 discloses a water-based inkjet ink containing an acetylenediol surfactant having an HLB value of 3 or less and a water-soluble organic solvent having an HLB value of 8 or less. Patent Document 2 also discloses that the use of the water-based inkjet ink suppresses white spotting and uneven coalescence caused by the insufficient spreading and wetting ability of the water-based inkjet ink on the non-permeable substrate, and printed matter having excellent print quality is obtained. It is true that the use of the surfactant and the water-soluble organic solvent reduces image defects such as uneven coalescence in printing on the non-permeable substrate. However, when the water-based inkjet ink is used to print on a non-permeable substrate, the surfactant remains on the surface of the ink layer, and blocking may occur. In addition, since the surfactant has a low HLB value and is not easily absorbed by water, it tends to be intensively oriented at the gas-liquid interface on the nozzle of the inkjet head. As a result, for example, the water-based inkjet ink may overflow from the nozzle to the outside during ejection, and there is a possibility that a nozzle failure (a phenomenon in which the water-based inkjet ink is not ejected from the nozzle) may occur and straightness of ejection may be reduced. Details will be described later.

CITATION LIST

Patent Literature

Patent Literature 1: JP 2012-211260 A
Patent Literature 2: JP 2017-165809 A

SUMMARY OF THE INVENTION

Technical Problem

As described above, there has been no water-based inkjet ink that simultaneously satisfies all of print quality (suppression of beading), blocking resistance, and ejection stability at a high level, especially for non-permeable substrates.

An embodiment of the present invention provides a water-based inkjet ink which has excellent ejection stability, suppresses beading even with respect to an impermeable substrate, and enables printed matter having excellent blocking resistance to be obtained.

Solution to Problem

As a result of intense study by the inventors of the present invention, it has been found that the above-described problem can be solved by a water-based inkjet ink having the following composition.

That is, an embodiment of the present invention relates to a water-based inkjet ink. Another embodiment of the present invention relates to printed matter using the water-based inkjet ink. More specifically, embodiments of the present invention include the following. However, the present invention is not limited to the following embodiments, but includes various embodiments.

[1] A water-based inkjet ink comprising a pigment, a surfactant (A), and a water-soluble organic solvent (B), wherein
  the surfactant (A) includes an acetylenediol surfactant (A1) having a structure represented by General Formula (1) described below, and having an HLB value of 10 or less;
  the water-soluble organic solvent (B) includes an alkanediol (B1) having 3 to 5 carbon atoms and a glycol monoether (B2) having 4 to 10 carbon atoms; and
  a mass ratio ((B1)/(B2)) between a content of the alkanediol (B1) having 3 to 5 carbon atoms and a content of the glycol monoether (B2) having 4 to 10 carbon atoms is 0.8 to 12.

General Formula (1):

[Chemical 1]

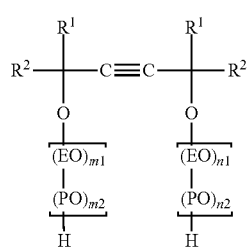

In General Formula (1), each of $R^1$ and $R^2$ represents an alkyl group having 1 to 5 carbon atoms, which may have branches, EO represents an ethylene oxide group, and PO represents a propylene oxide group. Further, each of m1, m2, n1, and n2 represents an integer of 1 to 10, and (m1+n1):(m2+n2)=1:9 to 9:1. Note that addition forms of ethylene oxide groups and propylene oxide groups in square brackets [ ] may be block type or random type.

[2] The water-based inkjet ink according to [1], wherein the surfactant (A) further includes a nonionic surfactant (A2) other than the acetylenediol surfactant (A1).

[3] The water-based inkjet ink according to [1] or [2], wherein a content of the acetylenediol surfactant (A1) is 0.1 to 5.0% by mass of the total amount of the water-based inkjet ink.

[4] A printed matter obtained by printing the water-based inkjet ink according to any one of [1] to [3].

The present disclosure relates to the subject matter of Japanese Patent Application No. 2023-089969, filed on May 31, 2023, the entire disclosure of which is incorporated herein by reference.

Advantageous Effects of Invention

The water-based inkjet ink according to one embodiment of the present invention has excellent ejection stability, and can suppress beading even when applied to an impermeable substrate, and can provide a printed matter having excellent printed images and blocking resistance.

DESCRIPTION OF EMBODIMENTS

A water-based inkjet ink (hereinafter, simply referred to as "water-based inkjet ink" or "ink") according to one embodiment of the present invention will be described below. The present invention is not limited to the embodiments described below, but includes embodiments which can be modified to the extent that the essential parts of the present invention are not changed.

As described above, the water-based inkjet ink according to the present embodiment having the above configuration can simultaneously solve all of the ejection stability, the beading suppression, and blocking resistance of printed matter against impermeable substrates at a high level. Although the mechanism is not clear, the inventors have speculated as follows. However, the present invention is not limited by the following speculation.

In order to suppress beading and improve print quality, it is necessary to reduce the surface tension immediately after ink landing. As a method for suppressing beading, there is the use of a surfactant having a high orientation speed on the droplet surface (gas-liquid interface). In particular, a surfactant having a small molecular weight and a low affinity for water has a high orientation speed on the gas-liquid interface and is effective for suppressing beading. Among these surfactants, an acetylenediol surfactant has an acetylene group that does not undergo rotation of bonds in the molecule. As a result, it is less likely to be structurally deformed than other surfactants such as polyoxyethylene alkyl ether surfactants. Therefore, even with a small amount of addition, a sufficient amount of molecules of the acetylenediol surfactant can be oriented on the gas-liquid interface. Therefore, from the viewpoint of improving the print quality of printed matter, it is preferable to select an acetylenediol surfactant having a small molecular weight and a low affinity with water. Examples of such compounds include, for example, an unmodified acetylenediol surfactant and an ethylene oxide-modified acetylenediol surfactant (low molar adduct) as used in Patent Literature 2.

On the other hand, such surfactants are naturally also present in large amounts on the surface of the ink layer. Because of their low molecular weight, it is considered that the surfactant molecules actively move under the influence of heat (for example, ambient temperature) or humidity. Therefore, for example, blocking is likely to occur when the printed matter is rolled up and stored.

In order to suppress blocking, for example, it is effective to make the surfactants to have a high molecular weight. However, if the ethylene-oxide-modified acetylenediol is made to have a high molecular weight, the hydrophilicity becomes too high, so that the orientation speed to the gas-liquid interface decreases and beading occurs. Furthermore, if an unmodified acetylenediol surfactant is made to have a high molecular weight, it cannot stably exist in the water-based inkjet ink, and deposition and ejection stability may deteriorate.

The water-based inkjet ink existing near the nozzle of the inkjet head also has a gas-liquid interface. Therefore, the surfactant is intensively oriented at the gas-liquid interface, and the water-based inkjet ink may overflow from the nozzle to the outside. For example, if the overflow of the water-based inkjet ink from the above-described nozzle occurs and progresses during continuous ejection, it causes ejection failure such as nozzle failures and deterioration of ejection straightness.

As described above, unmodified acetylenediol surfactants and ethylene oxide-modified acetylenediol surfactants (low mol adducts) are effective for improving print quality, but have a problem that they cause deterioration in characteristics such as blocking resistance and ejection stability.

On the other hand, the water-based inkjet ink in the present embodiment contains an acetylenediol surfactant (A1) having a structure represented by general formula (1) described above and having an HLB value of 10 or less as the acetylenediol surfactant. The acetylenediol surfactant (A1) has not only an ethylene oxide structure but also a propylene oxide structure. The propylene oxide structure has properties of both hydrophilicity and hydrophobicity, therefore by using it for modifying the acetylenediol surfactant together with the ethylene oxide structure precise control of the molecular weight, and further hydrophilicity and hydrophobicity (for example, HLB value) can be facilitated. In particular, when the acetylenediol surfactant (A1) having a structure represented by the general formula (1) described above and having an HLB value of 10 or less is selected and used, the hydrophobicity can be maintained in a molecular weight range in which blocking can be suppressed, and extreme reductions in the orientation speed to the gas-liquid interface can be prevented.

It is also considered that the alkanediol (B1) having 3 to 5 carbon atoms contained in the water-based inkjet ink in the present embodiment assist the above-described effects. The alkanediol (B1) having 3 to 5 carbon atoms includes a plurality of hydroxyl groups and has a small molecular weight. Therefore, while the alkanediol (B1) has a high affinity with water, it does not have an excessive affinity with the acetylenediol surfactant (A1) having an HLB value of 10 or less. The alkanediol (B1) having 3 to 5 carbon atoms also function as a moisturizing agent on the inkjet head nozzle. As a result, the alkanediol (B1) having 3 to 5 carbon atoms can contribute to the improvement of ejection stability without interfering with the orientation of the acetylenediol surfactant (A1).

Moreover, the water-based inkjet ink in the present embodiment contains a glycol monoether (B2) having 4 to 10 carbon atoms, and the mass ratio between a content of the alkanediol (B1) having 3 to 5 carbon atoms and a content of the glycol monoether (B2) having 4 to 10 carbon atoms is defined. Although the details are not clear, the glycol monoether having an alkylene oxide structure have a high affinity with the acetylenediol surfactant (A1) having an ethylene oxide structure and a propylene oxide structure. Furthermore, since the glycol monoether (B2) having 4 to 10 carbon atoms have a small molecular weight, it is considered that the molecules of the glycol monoether (B2) exist in state being close to the acetylenediol surfactant (A1). As a result, excessive orientation of the acetylenediol surfactant (A1) at the gas-liquid interface can be suppressed, and it is considered that the water-based inkjet ink does not overflow from the nozzle even during continuous ejection, and suitable ejection stability can be maintained.

On the other hand, if the orientation of the acetylenediol surfactant (A1) is suppressed, there is a risk that beading occurs. However, the glycol monoether (B2) having 4 to 10 carbon atoms have a lower surface tension than water and other water-soluble organic solvents. Therefore, it is considered that the glycol monoether (B2) contribute to the lowering of the surface tension together with the acetylenediol surfactant (A1) in the droplets of the water-based inkjet ink on the printing substrate, thereby suppressing beading.

As described above, the ink having the configuration of the present invention can solve the problem mentioned above simultaneously and at a high level.

Hereinafter, each component of the water-based inkjet ink according to an embodiment of the present invention will be described in detail.

<Surfactant (A)>

(Acetylenediol Surfactant (A1))

As described above, the water-based inkjet ink of the present embodiment contains, as the surfactant, the acetylenediol surfactant (A1) having a structure represented by the general formula (1) described below and having an HLB value of 10 or less. Since the acetylenediol surfactant (A1) has an ethylene oxide structure and a propylene oxide structure, the molecular weight, hydrophilicity and hydrophobicity can be easily controlled.

General Formula (1):

[Chemical 2]

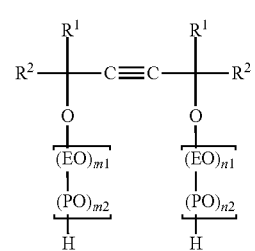

In general formula (1), each of $R^1$ and $R^2$ represents an alkyl group having 1 to 5 carbon atoms, which may have branches, EO represents an ethylene oxide group, and PO represents a propylene oxide group. Further, each of m1, m2, n1, and n2 represents an integer of 1 to 10, and (m1+n1):(m2+n2)=1:9 to 9:1. Note that the addition forms of ethylene oxide groups and propylene oxide groups in square brackets [ ] may be block type or random type.

In the general formula (1) described above, the values of m1, n1, m2, and n2 and the structures of $R^1$ and $R^2$ are changed to adjust the HLB value to 10 or less. Above all, the value of m1+n1 in the general formula (1) is preferably 2 to 10 and the value of m2+n2 is preferably 1 to 9 from the viewpoint of obtaining a compound falling within a range of suitable HLB values and molecular weight (as described in detail below). Further, the ratio of the number of ethylene oxide structures to the number of propylene oxide structures represented by (m1+n1):(m2+n2) is preferably 1:2 to 5:1, more preferably 1:1 to 4.5:1, and particularly preferably 1.2:1 to 4:1.

From the viewpoint of the orientation speed to the gas-liquid interface and the improvement of blocking resistance, the HLB value is 10 or less, preferably 4 to 9, and more preferably 5 to 8. When the HLB value is 10 or less, the hygroscopicity of the ink layer forming the printed matter is lowered, leading to improved blocking resistance. Furthermore, when the HLB value is used in combination with the alkanediol (B1) having 3 to 5 carbon atoms and the glycol monoether (B2) having 4 to 10 carbon atoms, it is possible to simultaneously suppress beading and improve blocking resistance and ejection stability.

The HLB (Hydrophile-Lipophile Balance) value is one of the parameters representing the hydrophilicity and hydrophobicity of a material. There are various methods for calculating the HLB value, such as Griffin's method, Davies' method, and Kawakami's method. In the present application, the value calculated by the Griffin's method is used as the HLB value of the acetylenediol surfactant (A1).

Griffin's method employs formula (2) described below using the molecular weight of a target compound. The smaller the HLB value, the higher the hydrophobicity of the target compound, and the larger the HLB value, the higher the hydrophilicity.

Formula (2)

$$HLB \text{ value} = 20 \times (\text{sum of molecular weights of hydrophilic parts})/(\text{molecular weight of material}).$$

As the acetylenediol surfactant (A1) having the HLB value of 10 or less, a compound represented by the general formula (1) described above can be used. Specifically, ethylene oxide and propylene oxide modified products such as 2,4,7,9-tetramethyl-5-decine-4,7-diol, 2,5,8,11-tetramethyl-6-dodecine-5,8-diol, hexadeca-8-yne-7,10-diol, 4,7-dipropyl-deca-5-yne-4,7-diol, 6,9-dimethyl-tetradeca-7-yne-6,9-diol, 3,6-diisopropyl-2,7-dimethylocta-4-yne-3,6-diol, octadeca-9-yne-8,11-diol, 7,10-dimethylhexadeca-8-yne-7,10-diol, 5,8-dibutyldodeca-6-yne-5,8-diol, 4,7-diisobutyl-2,9-dimethyl-deca-5-yne-4,7-diol, 5,14-diethyl-8,11-dimethyloctadeca-9-yne-8,11-diol can be mentioned. It should be noted that only one compound may be used, or two or more compounds may be used in combination. These compounds may be synthesized by a known synthetic method or commercially available products may be used.

Above all, from the viewpoint of compatibility with water and glycol monoethers (B2), it is preferable to use compounds obtained by modifying 2,4,7,9-tetramethyl-5-decine-4,7-diol and/or 2,5,8,11-tetramethyl-6-dodecine-5,8-diol with ethylene oxide and propylene oxide.

The molecular weight of the acetylenediol surfactant (A1) having the structure represented by the general formula (1) described above and having an HLB value of 10 or less is preferably 300 to 1,200, more preferably 400 to 900, and even more preferably 450 to 700. Since the acetylenediol surfactant (A1) having the molecular weight in the above range has a high orientation speed to the gas-liquid interface, beading can be suppressed and blocking resistance can be prevented from deteriorating. The molecular weight in the present application refers to a formula weight and can be calculated.

The content of the acetylenediol surfactant (A1) contained in the water-based inkjet ink of the present embodiment is preferably 0.1 to 5.0% by mass, more preferably 0.2 to 3.5% by mass, more preferably 0.3 to 2.5% by mass, particularly preferably 0.5 to 2.0% by mass, and most preferably 0.5 to 1.5% by mass of the total amount of the water-based inkjet ink. By using the acetylenediol surfactant (A1) within the above range, the suppression of beading, ejection stability, and blocking resistance can all be achieved at a high level.

[Other Surfactants]

The water-based inkjet ink in the present embodiment may further contains surfactants other than the acetylenediol surfactant (A1) (that is, different from (A1) described above) having an HLB value of 10 or less.

For the water-based inkjet ink in the present embodiment, one or more kinds selected from the group consisting of ionic (anionic or cationic) surfactants, amphoteric surfactants, and nonionic surfactants (except acetylenediol surfactant (A1)) can be used as the other surfactants described above. In particular, from the viewpoint of compatibility with glycol monoethers (B2) and the acetylenediol surfactant (A1), it is preferable to use a nonionic surfactant (in the present application, it is simply referred to as "nonionic surfactant (A2)") other than the acetylenediol surfactant (A1) as the other surfactants.

<Nonionic Surfactant (A2)>

An acetylenediol surfactant (except acetylenediol surfactant (A1)), an acetylenemonool surfactant, a siloxane surfactant, a fluorine surfactant, a polyoxyalkylene monoalkyl ether surfactant (in which, however, the oxyalkylene group is an oxyethylene group and/or an oxypropylene group, and the number of the oxyalkylene group is 5 to 100 and/or the number of carbon atoms of the terminal alkyl group is 5 to 22), or the like can be used as the nonionic surfactant (A2).

Only one of the other surfactants may be used alone, or two or more of these surfactants may be used in combination.

Among the other surfactants, it is preferable to use one or more kinds selected from the group consisting of acetylenediol surfactants (except acetylenediol surfactant (A1)), siloxane surfactants, and polyoxyalkylene monoalkyl ether surfactants (in which, however, the oxyalkylene group is an oxyethylene group and/or an oxypropylene group, and the number of oxyalkylene groups is 5 to 100 and/or the number of carbon atoms of the terminal alkyl group is 5 to 22) as the nonionic surfactant (A2). These are preferable because they function in the same way as glycol monoethers (B2) by compatibilization with the acetylenediol surfactant (A1), or emulsification of the acetylenediol surfactant (A1), and both improvement of ejection stability and suppression of beading can be expected.

Among the other surfactants, it is preferable to use a siloxane surfactant as the nonionic surfactant (A2). The siloxane surfactant has a high ability to compatibilize the acetylenediol surfactant (A1), and can greatly improve ejection stability. In addition, after landing of the droplets of water-based inkjet ink on the printing substrate, the siloxane surfactant is oriented on the surface of the droplets behind the orientation of the acetylenediol surfactant (A1). As a result, the droplets can be sufficiently spread to wet, the beading can be suppressed at a higher level, and the blocking resistance can be expected to be improved.

From the viewpoint of improving the blocking resistance and ejection stability of the printed matter, it is preferable to use both the siloxane surfactant and the acetylenediol surfactant (except acetylenediol surfactant (A1)) as the nonionic surfactant (A2). In one embodiment, the sum of the content of the siloxane surfactant and the content of the acetylenediol surfactant (except acetylenediol surfactant (A1)) is preferably 20 to 850% by mass, and particularly preferably 40 to 400% by mass, relative to the content of the acetylenediol surfactant (A1). When the sum of the above contents is adjusted within the range described above, the effect of suppressing beading and the blocking resistance can be easily improved while realizing suitable print quality.

In another embodiment, the content of the acetylenediol surfactant (except acetylenediol surfactant (A1)) is preferably 10 to 250% by mass, and particularly preferably 25 to 120% by mass, relative to the content of the acetylenediol surfactant (A1). When the content is adjusted as described above, the effect of the acetylenediol surfactant (A1) can be suitably expressed, and the suppression of beading, blocking resistance and the improvement of ejection stability can all be simultaneously realized.

On the other hand, when a siloxane surfactant is used as the nonionic surfactant (A2), it is preferable to use the siloxane surfactant in combination with two or more kinds of siloxane surfactants having different orientation speeds to the interface from the viewpoint of suppressing beading and easily obtaining printed matter having excellent print quality. Since the orientation speed depends on a molecular structure of a surfactant, examples of the "two or more kinds of siloxane surfactants having different orientation speeds" include two or more kinds of modified siloxane surfactants having different modified kinds and/or modified positions; and/or two or more kinds of siloxane surfactants having different mass-average molecular weights; or the like. Examples of the "two or more kinds of modified siloxane surfactants having different modified kinds and/or modified positions" include a combination of a polyether-modified siloxane surfactant having a polyether structure in a side chain, and a polyether-modified siloxane surfactant having a polyether structure at both ends of the molecular chain.

On the other hand, examples of the "two or more kinds of siloxane surfactants having different mass-average molecular weights" include a combination of siloxane surfactants having a mass-average molecular weight difference of 800 to 15,000. From the viewpoint of obtaining printed matter having excellent print quality, the difference in the mass-average molecular weight is more preferably 1,200 to 12,000, and particularly preferably 1,500 to 10,000.

The mass-average molecular weight of the siloxane surfactant can be measured by gel permeation chromatography. More specifically, for example, the mass-average molecular weight can be measured by using a TSKgel column (manufactured by Tosoh Corporation) and an HLC-8120GPC (manufactured by Tosoh Corporation) equipped with an RI detector, and using THF as a developing solvent.

The content of the nonionic surfactant (A2) contained in the water-based inkjet ink of the present embodiment is preferably 0.1 to 5.0% by mass, more preferably 0.2 to 2.5% by mass, even more preferably 0.4 to 2.0% by mass, and particularly preferably 0.4 to 1.5% by mass of the total amount of the water-based inkjet ink. By using the nonionic surfactant (A2) within the range described above, it is possible to achieve all of suppression of beading, ejection stability, and blocking resistance at a high level.

Examples of commercially available acetylenediol surfactants (except acetylenediol surfactant (A1)) that can be used as the nonionic surfactant (A2) are shown below.

Surfynol 61, 104E, 104H, 104A, 104BC, 104DPM, 104 PA, 104PG-50, 420, 440, 465, 485, SE, SE-F, Dynol 604, and 607 (manufactured by Evonik Industries AG); and Olfine E1004, E1010, E1020, PD-001, PD-002W, PD-004, PD-005, EXP. 4001, EXP. 4200, EXP. 4123, and EXP. 4300 (manufactured by Nisshin Chemical Industry Co., Ltd.).

Only one of the products listed above may be used, or two or more kinds may be used in combination. These compounds may be synthesized by a conventionally known synthetic method, or commercial products may be used.

Above all, from the viewpoint of compatibility with water, the alkanediol (B1), and the glycol monoether (B2), and from the viewpoint of blocking resistance, it is preferable to use compounds in which 2,4,7,9-tetramethyl-5-decine-4,7-diol, or 2,5,8,11-tetramethyl-6-dodecine-5,8-diol are modified with ethylene oxide, such as Surfynol 465, 485, Dynol 604, 607, and Olfine E1010, 1020.

Examples of commercially available siloxane surfactant that can be used as nonionic surfactants (A2) are shown below.

BY16-201, FZ-77, FZ-2104, FZ-2110, FZ-2162, F-2123, L-7001, L-7002, SF8427, SF8428, SH3749, SH8400, 8032ADDITIVE, and SH3773M (manufactured by Dow Corning Toray Co., Ltd.);

TEGO Glide 100, TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270, and TEGO Wet 280 (manufactured by Evonik Industries AG);

SAG-002 and SAG-503A (manufactured by Nisshin Chemical Industry Co., Ltd.);

BYK-331, BYK-333, BYK-345, BYK-346, BYK-347, BYK-348, BYK-349, BYK-3420, BYK-UV3500, and BYK-UV3510 (manufactured by BYK-Chemie GmbH); and KF-351A, KF-352A, KF-353, KF-354L, KF-355A, KF-6004, KF-6011, KF-6012, KF-6013, KF-6015, KF-6016, KF-6017, KF-6043, KF-615A, KF-640, KF-642, and KF-643 (Shin-Etsu Chemical Co., Ltd).

Only one of the products listed above may be used, or two or more kinds may be used in combination. These compounds may be synthesized by a conventionally known synthetic method, or commercially available products may be used.

Examples of commercially available products of polyoxyalkylene monoalkyl ether surfactants that can be used as nonionic surfactants (A2) are shown below.

Nonionic series such as nonionic K-204, 220, 230, 2100 W, P-208, 210, 213, S-202, 207, 215, 220, and 250 (manufactured by NOF Corporation); Emulgen series (manufactured by Kao Corporation); and Tergitol L series, Tergitol X series, and Tergitol TWN series (manufactured by DOW Chemical Co.).

Only one of the products listed above may be used, or two or more kinds may be used in combination. These compounds may be synthesized by a conventionally known synthetic method or commercially available products may be used.

The total amount of the surfactant contained in the water-based inkjet ink in the present embodiment is preferably 0.1 to 5% by mass, more preferably 0.2 to 4.5% by mass, more preferably 0.3 to 4% by mass, and particularly preferably 0.4 to 3.5% by mass of the total amount of the water-based inkjet ink.

<Water-Soluble Organic Solvent (B)>

The water-based inkjet ink of the present embodiment contains the water-soluble organic solvent (B). As described above, the water-soluble organic solvent (B) includes an alkanediol (B1) having 3 to 5 carbon atoms and a glycol monoether (B2) having 4 to 10 carbon atoms. The term "water-soluble organic solvent" as used herein refers to a solvent that has a solubility of 1% by mass or more in water at 25° C., and is a liquid at 25° C.

(Alkanediol (B1) Having 3 to 5 Carbon Atoms)

The alkanediol (B1) having 3 to 5 carbon atoms are considered to contribute to the improvement of ejection stability, since they exhibit moisture retention without inhibiting the orientation of the acetylenediol surfactant (A1). As the alkanediol (B1) having 3 to 5 carbon atoms, 1,2-propanediol, 1,2-butanediol, 1,2-pentanediol, 1,3-propanediol, 1,3-butanediol, 1,4-butanediol, 1,3-pentanediol, 1,4-pentanediol, 1,5-pentanediol, 2-methyl-1,3-propanediol, 3-methyl-1,3-butanediol, 2,2-dimethyl-1, 3-propanediol, or the like, can be used. One of these compounds may be used alone, or two or more compounds may be used in combination.

An SP value of the alkanediol (B1) having 3 to 5 carbon atoms is preferably 12.0 to 14.0 $(cal/cm^3)^{1/2}$, more preferably 12.5 to 14.0 $(cal/cm^3)^{1/2}$. The alkanediol (B1) within the range described above do not have excessive affinity with the acetylenediol surfactant (A1). As a result, the orientation of the acetylenediol surfactant (A1) is not excessively inhibited, and this not only improves ejection stability but also contributes to suppression of beading.

The "SP value" is an abbreviation of Solubility Parameter. In this specification, a value (in $(cal/cm^3)^{1/2}$) calculated by an estimation method by Fedor is used.

Furthermore, among the alkanediol (B1) having 3 to 5 carbon atoms (preferably, the alkanediol (B1) having the SP value described above), 1,2-propanediol and/or 1,2-butanediol are particularly preferably used. While these water-soluble organic solvents have high hydrophilicity, they do not have excessive affinity with the acetylenediol surfactant (A1). Therefore, it is considered that the water-soluble organic solvents do not inhibit the orientation of the acetylenediol surfactant (A1) to the gas-liquid interface, and the effect thereof can be maximized, thereby facilitating the production of printed matter free from beading. In addition, since these water-soluble organic solvents volatilize rapidly after landing on the printing substrate, printed matter excellent in drying properties and blocking resistance is obtained. In addition, these water-soluble organic solvents have a property that a dispersed state of pigments described below is not easily destroyed, and can be suitably used in that deterioration of the storage stability of the water-based inkjet ink can be prevented.

The content of the alkanediol (B1) having 3 to 5 carbon atoms contained in the water-based inkjet ink in the present embodiment is preferably 5 to 35% by mass, more preferably 10 to 30% by mass, and even more preferably 10 to 25% by mass of the total amount of the water-based inkjet ink.

(Glycol Monoether (B2) Having 4 to 10 Carbon Atoms)

On the other hand, the water-based inkjet ink in the present embodiment containing a glycol monoether (B2) having 4 to 10 carbon atoms has high affinity with the acetylenediol surfactant (A1) and can suppress excessive orientation, thereby improving ejection stability. Further, the glycol monoether (B2) having 4 to 10 carbon atoms contribute to lowering the surface tension on the printing substrate together with the acetylenediol surfactant (A1), so that beading can be suppressed.

Examples of the glycol monoether (B2) having 4 to 10 carbon atoms that can be used include ethylene glycol monoethyl ether, ethylene glycol monopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monopropyl ether, diethylene glycol monobutyl ether, diethylene glycol monohexyl ether, diethylene glycol monophenyl ether, diethylene glycol monobenzyl ether, triethylene glycol monomethyl ether, triethylene glycol monoethyl ether, triethylene glycol monobutyl ether, propylene glycol monomethyl ether, propylene glycol monoethyl ether, propylene glycol monobutyl ether, propylene glycol monopropyl ether, propylene glycol monopropyl ether, propylene glycol monobutyl ether, dipropylene glycol monomethyl ether, Dipropylene glycol monoethyl ether, dipropylene glycol monopropyl ether, dipropylene glycol monobutyl ether or the like. One of compounds may be used alone, or two or more compounds may be used in combination.

Among these, one or more kinds selected from diethylene glycol monomethyl ether, diethylene glycol monoethyl ether, diethylene glycol monobutyl ether, diethylene glycol monohexyl ether, propylene glycol monomethyl ether, propylene glycol monoethyl ether, propylene glycol monopropyl ether, and propylene glycol monobutyl ether are preferably used. One or more kinds selected from diethylene glycol monoethyl ether, diethylene glycol monobutyl ether, diethylene glycol monohexyl ether, propylene glycol monomethyl ether, propylene glycol monoethyl ether and propylene glycol monobutyl ether are more preferably used. These water-soluble organic solvents easily orient at the gas-liquid interface without having excessive affinity with water. In addition, they have moderate affinity with acetylene diol surfactant (A1) (and, if used, a nonionic surfactant (A2)), and the orientation speed of these surfactants at the gas-liquid interface is adjusted, thereby improving ejection stability. Furthermore, these water-soluble organic solvents contribute to lowering the surface tension together with the acetylenediol surfactant (A1) on the printing substrate, so that beading can be suppressed. In addition, these water-soluble organic solvents not only have excellent drying properties, but also function as film-forming aids for resins as described below, and therefore contribute to the improvement of blocking resistance.

In particular, in one embodiment, one or more kinds of compounds selected from the group consisting of propylene glycol monomethyl ether, propylene glycol monoethyl ether, diethylene glycol monoethyl ether, and diethylene glycol monobutyl ether can be preferably used as the glycol monoethers (B2), as the effects described above are remarkably manifested. Particularly preferably, propylene glycol monomethyl ether and/or propylene glycol monoethyl ether can be used. Propylene glycol monomethyl ether and propylene glycol monoethyl ether are compounds having a small molecular weight, and have a PO group similar to the acetylenediol surfactant (A1). Therefore, it is considered that the water-soluble organic solvent and the acetylenediol surfactant (A1) interact with each other and orient at the gas-liquid interface while maintaining a suitable compatibility state. As a result, a remarkable effect is exerted on the ejection stability due to moisture retention or compatibility, and on the suppression of beading due to the improvement of the orientation speed.

The content of the glycol monoethers (B2) having 4 to 10 carbon atoms contained in the water-based inkjet ink of the present embodiment is preferably 0.5 to 20% by mass, more preferably 1 to 15% by mass, and even more preferably 2 to 10% by mass of the total amount of the water-based inkjet ink.

In the water-based inkjet ink in the present embodiment, from the viewpoint of controlling the affinity of the acetylenediol surfactant (A1) and achieving beading suppression, ejection stability, and blocking resistance at the same time, the mass ratio ((B1)/(B2)) between the content of the alkanediol (B1) having 3 to 5 carbon atoms to the content of the glycol monoether (B2) having 4 to 10 carbon atoms is 0.8 to 12, more preferably 1 to 8, and more preferably 1.5 to 5. In the above range, the affinity of the acetylenediol surfactant (A1) is suitable, and the beading suppression effect can be maximized. The ejection stability can also be improved by suppressing the concentrated orientation of the surfactant at the gas-liquid interface. Furthermore, the water-based inkjet ink is excellent in drying properties, so that it is possible to prevent the deterioration of blocking resistance.

In order to simultaneously realize all of the improvement of ejection stability, the suppression of beading, and the improvement of blocking resistance, it is further preferable to consider the drying behavior of the water-soluble organic solvent. Specifically, the energy required to evaporate the alkanediol (B1) having 3 to 5 carbon atoms is preferably 1.2 to 20 times, more preferably 2.5 to 16 times, and particularly preferably 3.5 to 13 times the energy required to evaporate the glycol monoether (B2) having 4 to 10 carbon atoms.

Although the detailed mechanism is unknown, by using the alkanediol (B1) having 3 to 5 carbon atoms and the glycol monoethers (B2) having 4 to 10 carbon atoms in combination so that the ratio of the energy falls within the range described above, it is possible to prevent the water-soluble organic solvent from being volatilized before the effects of controlling the affinity with the acetylenediol surfactant (A1) and adjusting the orientation speed of the acetylenediol surfactant (A1) are achieved. In addition, the balance between the amount of the alkanediol (B1) and the amount of the glycol monoether (B2) does not fluctuate greatly while the drying of the water-based inkjet ink on the printing substrate is progressing. As a result, it is possible to improve the ejection stability, and to suppress beading and improve the blocking resistance of the printed material for the impermeable substrate.

The energy required to evaporate the water-soluble organic solvent can be calculated by formula (3) below:

$$VE = (BP - 25) \times MP \times SH \quad \text{Formula (3)}$$

In the formula (3) shown above, VE is the energy (cal) required to evaporate a target water-soluble organic solvent contained in the water-based inkjet ink. BP is the boiling point (° C.) of the water-soluble organic solvent at 1 atm. MP is a content (% by mass) of the water-soluble organic solvent in the water-based inkjet ink. SH is specific heat (cal/g·° C.) of the water-soluble organic solvent at 25° C. The value calculated by the Missenard estimation method can be used as the specific heat.

In the Missenard estimation method, the sum of the values determined according to a molecular structure and temperature of a target compound is determined as the specific heat (cal/mol·° C.) at the temperature described above. The unit of the specific heat calculated by the Missenard estimation method is "cal/mol·° C.". Therefore, in the formula (3) described above, the value of the specific heat of the target compound obtained by the Missenard estimation method is divided by the molecular weight of the compound. An example of the value at 25° C. determined according to the molecular structure is shown in Table 1.

TABLE 1

| Molecular Structure | Additional Value |
| --- | --- |
| —CH3 | 10.0 |
| —CH2— | 6.8 |
| —CH— | 6.0 |
| >C< | 2.0 |
| —O— | 7.1 |
| —OH | 10.5 |
| —COO— | 14.1 |

(Other Water-Soluble Organic Solvents)

The water-based inkjet ink in the present embodiment may contain water-soluble organic solvents other than the alkanediol (B1) having 3 to 5 carbon atoms and the glycol monoether (B2) having 4 to 10 carbon atoms, hereinafter referred to as "other water-soluble organic solvents".

In the water-based inkjet ink in the present embodiment, as the other water-soluble organic solvents, alkanediols having 6 carbon atoms; alkanetriols (those having 3 to 6 carbon atoms); polyoxyalkylene diols (in which the oxyalkylene groups are oxyethylene groups or oxypropylene groups, and the number of oxyalkylene groups is 2 to 4); glycol monoethers ((poly)oxyalkylene monoalkyl ethers)(in which the oxyalkylene groups are oxyethylene groups or oxypropylene groups, the number of oxyalkylene groups is 1 to 4, the terminal alkyl group has 1 to 4 carbon atoms, and which have 11 or more carbon atoms); glycol diethers ((poly)oxyethylene dialkyl ethers, in which the number of oxyalkylene groups is 1 to 4, and each of the terminal alkyl groups has 1 to 4 carbon atoms); lactams (in which the number of atoms constituting the lactam ring is 5 to 7, and in which an alkyl group having 1 or 2 carbon atoms, a hydroxyalkyl group having 1 or 2 carbon atoms, or a vinyl group may be bonded to a nitrogen atom and/or a carbon atom constituting the lactam ring); alkanol amines (in which the number of amino groups is 1, the number of hydroxyl groups is 1 to 3, and which have 3 to 9 carbon atoms) or the like can be used. Only one other water-soluble organic solvent may be used alone, or two or more kinds of other water-soluble organic solvents may be used in combination.

In the present application, "(poly)oxyalkylene" represents oxyalkylene and polyoxyalkylene.

The total amount of the water-soluble organic solvents contained in the water-based inkjet ink in the present embodiment is preferably 5 to 50% by mass, more preferably 9 to 40% by mass, more preferably 12 to 35% by mass, and particularly preferably 15 to 30% by mass of the total amount of the water-based inkjet ink.

<Resin>

The water-based inkjet ink in the present embodiment preferably contains a resin.

Generally, water-soluble resins and resin fine particles are known as forms of resins used in a water-based inkjet ink. In the water-based inkjet ink in the present embodiment, the resin contained in the water-based inkjet ink may be a water-soluble resin or resin fine particles. Further, a combination of a water-soluble resin and resin fine particles may be used.

In the present specification, a resin having a solubility of 1 g or more in 100 g of water at 25° C. is referred to as a "water-soluble resin", and a resin having a solubility of less than 1 g is referred to as a "water-insoluble resin". Among the water-insoluble resins, a resin having a particle-like dispersion in water and having a median diameter (also referred to as "D50" in the present application) of 10 to 1,000 nm on a volume basis is referred to as a "resin fine particle".

D50, as used herein, is a value measured under an environment of 25° C. using a particle size distribution measuring device in a dynamic light scattering method, such as "Nanotrac UPA-EX150" manufactured by MicrotracBEL Corp.

Examples of resin types that can be used in the water-based inkjet ink in the present embodiment include acrylic resins, styrene resins, (anhydrous) maleic acid resins, styrene-(anhydrous) maleic acid resins, olefin-(anhydrous) maleic acid resins, urethane resins, polyester resins, vinyl chloride resins, vinyl chloride-vinyl acetate resins, polyolefin resins, vinyl alcohol resins, and the like. Only one resin may be used alone, or two or more resins may be used in combination.

The term "acrylic resin" as used herein refers to a resin using an acrylic ester and/or a methacrylic ester as a polymerizable monomer (a styrene monomer may also be used). The term "(anhydrous) maleic acid" refers to at least one kind selected from "maleic acid" and "maleic anhydride".

The resins are used for a variety of purposes, such as pigment dispersion, binding, waxing, and thickening. The resins may be used for a single purpose, or may be used for multiple purposes.

Above all, from the viewpoint that blocking resistance can be improved, the resin is preferably used for the purpose of binding and/or pigment dispersion.

(Binder Resin)

In one embodiment, it is preferable to add a resin used for binding (also referred to as "binder resin" in the present application) to the water-based inkjet ink from the viewpoint of improving coating film resistance, and blocking resistance of the printed matter. When the water-based inkjet ink in the present embodiment contains a binder resin, the kind of resin used as the binder resin may be any of those listed above. The binder resin is preferably one or more kinds selected from the group consisting of acrylic resins, urethane resins, and polyester resins. Resin fine particles are preferably used as a form of the resin.

The suitable binder resin content included in the water-based inkjet ink in the present embodiment is preferably 0.1 to 20% by mass, more preferably 0.2 to 15% by mass, even more preferably 0.3 to 12% by mass, and particularly preferably 0.5 to 10% by mass of the total amount of the water-based inkjet ink.

(Pigment Dispersing Resin)

When the water-based inkjet ink in the present embodiment contains a pigment as a colorant, the blocking resistance of the printed matter can be improved by using a resin (also referred to as "pigment dispersing resin" herein) used for dispersing pigment. In this case, the kinds of resins used as the pigment dispersing resin may be any of those listed above. The pigment dispersing resin is preferably one or more kinds selected from the group consisting of a styrene-(anhydrous) maleic acid resin, olefin-(anhydrous) maleic acid resin, and acrylic resin.

<Colorant>

[Pigments]

The water-based inkjet ink in the present embodiment contains a colorant. It is preferable that the colorant contains a pigment from the viewpoint of obtaining printed matter having a high concentration or concealability, excellent light resistance, water resistance, or the like.

Any conventionally known organic or inorganic pigment can be used as the pigment, and for example, pigments represented by the following color index names can be used:

Specifically, as red pigments: C. I. Pigment Red 52, 5, 7, 9, 12, 17, 22, 23, 31, 48:1, 48:2, 48:3, 48:4, 49:1, 49:2, 57:1, 57:2, 112, 122, 123, 146, 147, 149, 150, 166, 168, 170, 171, 175, 176, 177, 178, 184, 188, 202, 207, 209, 254, 255, 260, 264, 266, 269, 282;

as violet pigments: C. I. Pigment Violet 19, 23, 29, 32, 36, 37, 42, 50;

as orange pigments: C. I. Pigment Orange 1, 2, 3, 5, 7, 13, 14, 15, 16, 22, 34, 36, 38, 40, 43, 47, 48, 49, 51, 52, 53, 60, 61, 62, 64, 65, 66, 69, 71, 73;

as blue pigments: C. I. Pigment Blue 15, 15:3, 15:4, 15:6, 16, 60, 64, 79;

as green pigments: C. I. Pigment Green 7, 10, 36, 48;

as yellow pigments: C. I. Pigment Yellow 1, 2, 3, 5, 12, 13, 14, 16, 17, 24, 73, 74, 83, 87, 93, 94, 95, 97, 98, 109, 110, 111, 112, 120, 126, 127, 128, 129, 137, 138, 139, 147, 150, 151, 154, 155, 166, 167, 168, 170, 180, 185, 213;

as black pigments: C. I. Pigment Black 1, 7, 11; and as white pigments: C. I. Pigment White 4, 5, 6, 21 or the like are used.

Only one pigment may be used alone, or two or more pigments may be used in combination. A solid solution composed of two or more kinds of the pigments listed above may also be used as the pigment.

The content of the pigment contained in the water-based inkjet ink in the present embodiment may be adjusted according to the use of the printed matter produced using the water-based inkjet ink. In one embodiment, the content of the pigment in the total amount of the water-based inkjet ink is preferably 0.5 to 30% by mass. In the case of inks other than a white water-based inkjet ink (water-based white ink), the content of the pigment is more preferably 1 to 15% by mass, and particularly preferably 1.5 to 10% by mass, from the viewpoint that printed matter having a high concentration can be obtained without deteriorating the ejection stability of the water-based inkjet ink. On the other hand, in the case of a water-based white ink, the content of the pigment is more preferably 5 to 25% by mass, and particularly preferably 10 to 20% by mass, from the viewpoint that printed matter having a high concealability can be obtained without deteriorating the ejection stability of the water-based white ink.

<Other Components>

The water-based inkjet ink of the present embodiment may contain, in addition to the components described above, a pH adjuster, a preservative, and other additives. Examples of the other additives include a crosslinking agent, a preservative, an ultraviolet absorber, and an infrared absorber. One or more kinds of conventionally known compounds may be used for each of these components.

<Water>

The water contained in the water-based inkjet ink in the present embodiment is preferably ion-exchanged water and/ or reverse osmosis water. The content of water contained in the water-based inkjet ink is preferably 30 to 90% by mass, and particularly preferably 45 to 85% by mass of the total amount of the water-based inkjet ink.

<Method of Producing Water-Based Inkjet Ink>

The water-based inkjet ink in the present embodiment can be produced by any conventionally known method. For example, when a colorant that is water-insoluble (water-insoluble colorant) is used as a colorant, dispersion liquid of a water-insoluble colorant is produced by dispersing the water-insoluble colorant, in advance, in a medium containing at least water (aqueous medium). On the other hand, when a colorant that is water-soluble (water-soluble colorant) is used as a colorant, an aqueous solution of a water-soluble colorant is produced by dissolving the water-soluble colorant, in advance, in the aqueous medium. Water, the surfactant (A), the water-soluble organic solvent (B), or the like are added to the dispersion liquid of the water-insoluble colorant and/or the aqueous solution of the water-soluble colorant, and after sufficiently stirring and mixing, coarse particles are removed by filtration, centrifugation, or the like. However, the method for producing the water-based inkjet ink in the present embodiment is not limited to the method described above.

<Characteristics of the Water-Based Inkjet Ink>

The water-based inkjet ink in the present embodiment preferably has a viscosity of 3 to 15 mPa·s at 25° C. In this viscosity range, droplets of the water-based inkjet ink can be ejected stably not only from an inkjet head having an ejection frequency of about 4 to 10 KHz, but also from an inkjet head having a high ejection frequency of about 20 to 70 KHz. In particular, when the viscosity of the water-based inkjet ink in the present embodiment at 25° C. is 4 to 10 mPa·s, the water-based inkjet ink can be ejected stably even when an inkjet head having a design resolution of 600 dpi or higher is used. As the viscosity as used herein is a value measured under an environment of 25° C. using a cone plate type rotational viscometer (E-Type viscometer, cone angle 1° 34') such as "TVE25L type viscometer" manufactured by Toki Sangyo Co., Ltd.

From the viewpoint of obtaining a water-based inkjet ink having excellent ejection stability and print quality of the printed matter, the static surface tension of the water-based inkjet ink in the present embodiment at 25° C. is preferably 18 to 35 mN/m, and particularly preferably 21 to 32 mN/m. As the static surface tension herein, a value measured under an environment of 25° C. using the Wilhelmy method (plate method) such as "Automatic Surface Tensiometer CBVP-Z" manufactured by Kyowa Interface Science Co., Ltd. is used.

When the water-based inkjet ink in the present embodiment contains a water-insoluble colorant, the median diameter (D50) of the water-insoluble colorant on a volume basis is preferably 30 to 450 nm, more preferably 50 to 400 nm, and particularly preferably 70 to 350 nm, from the viewpoint of achieving both ejection stability and density or concealability of the printed matter at a high level.

<A Set of Water-Based Inkjet Inks>

One kind of water-based inkjet ink in the present embodiment may be used alone, or it is also possible to use a set of water-based inkjet inks in which two or more kinds of water-based inkjet inks are combined. The water-based inkjet ink set includes, for example, a set of four water-based inkjet inks (process color ink set) consisting of a cyan water-based inkjet ink (water-based cyan ink), a magenta water-based inkjet ink (water-based magenta ink), a yellow water-based inkjet ink (water-based yellow ink), and a black water-based inkjet ink (water-based black ink); a set of five water-based inkjet inks in which a water-based white ink is added to the process color ink set; or the like. It is preferable that all the water-based inkjet inks constituting the water-based inkjet ink set satisfy the requirements of the embodiment of the present invention described above.

<Ink-Pretreatment Liquid Set>

The water-based inkjet ink of the present embodiment and the water-based inkjet ink set can also be used in combination with a pretreatment liquid containing a flocculant (as an ink-pretreatment liquid set). By applying the pretreatment liquid containing a flocculant to a printing substrate before printing the water-based inkjet ink, a layer (ink flocculation layer) for intentionally flocculating solid components included in the water-based inkjet ink can be formed. By landing the water-based inkjet ink on the ink flocculation layer, coalescence and color mixing of droplets of the water-based inkjet ink can be prevented, and the print quality of the printed matter can be remarkably improved.

As the flocculant, for example, a water-soluble inorganic salt or an organic salt containing a polyvalent metal ion and a resin having a cationic group, and having a cationic group equivalent greater than an anionic group equivalent can be used.

<Inkjet Printing Method>

The water-based inkjet ink in the present embodiment is used in the inkjet printing method as described above. The inkjet printing method typically includes an ink ejection process and a drying process of the ejected ink. In the printing method as described above, the water-based inkjet ink in the present embodiment is ejected onto a printing substrate from an inkjet head having a fine nozzle (ejection process). The water-based inkjet ink ejected onto the printing substrate is preferably dried by a drying mechanism (drying process).

(Ejecting Process)

As an example of an operation method of the inkjet head in the ejection process, there is a shuttle (scanning) method in which the water-based inkjet ink ejection and recording are performed while the inkjet head is reciprocated in a direction perpendicular to the conveying direction of the printing substrate. Another example of the operation method is a single-pass method in which the water-based inkjet ink ejection and recording are performed when a printing substrate is passed under an inkjet head arranged in a fixed manner. The inkjet head mounted with the water-based inkjet ink in the present embodiment may adopt either a shuttle method or a single-pass method. Above all, the single-pass method is preferably selected from the viewpoint that deviation in the landing position of the droplets of the water-based inkjet ink does not often occurs and the print quality of the printed matter is improved.

With respect to ejection methods from an inkjet head, any known method can be selected. Examples of such ejection methods include, for example, a piezoelectric method using a change in the volume of a piezoelectric element, a thermal method in which the water-based inkjet ink is ejected using bubbles generated by heating with a heater, and a valve method in which a pressurized water-based inkjet ink is ejected while opening and closing a lid (valve) of a nozzle by a solenoid.

The amount of droplets of the water-based inkjet ink ejected from the inkjet head is preferably 0.5 to 20 picoliter, and particularly preferably 0.5 to 15 picoliter from the viewpoint of reducing a load by drying and improving the print quality. It is also preferable to adjust printing conditions (specifically, the driving frequency, the number of installed inkjet heads, and the printing speed) from the viewpoint of improving the print quality. In one embodiment, the printing conditions may be adjusted so that the recording resolution of the printed matter is preferably 600 dpi or more, and more preferably 1200 dpi or more.

(Drying Process)

Examples of drying methods employed in the drying mechanism used in the drying process include a heat drying method, a hot air drying method, an infrared (for example, infrared light having a wavelength of 700 to 2500 nm) drying method, a microwave drying method, a drum drying method, or the like. In the drying process, any one or more of these methods can be selected and used. When two or more of the drying methods above are employed, the respective drying methods may be used separately (for example, consecutively) or simultaneously. For example, by using the heat drying method and the hot air drying method together, the water-based inkjet ink can be dried more quickly than when the each of the methods is used alone.

In particular, from the viewpoint of preventing bumping of liquid components in the water-based inkjet ink and obtaining printed matter excellent in print quality, the drying temperature is preferably set to 35 to 100° C. when the heat drying method is employed. When the hot air drying method is employed, the hot air temperature is preferably set to 50 to 250° C. From the same viewpoint, when the infrared drying method is employed, it is preferable that 50% or more of the integrated value of the total output of the irradiated infrared ray exists in the wavelength region of 700 to 1500 nm.

<Printed Matter>

The printed matter according to one embodiment of the present invention has a printing substrate and a printing layer including images or characters formed by printing the water-based inkjet ink in the present embodiment on the printing substrate. Printing can be suitably carried out in accordance with the inkjet printing method. Details of the printing method and printing conditions are as described above.

(Printing Substrate)

The printing substrate on which the water-based inkjet ink in the present embodiment is printed is not particularly limited, and any known substrate such as a permeable substrate, a poorly permeable substrate, or an impermeable substrate can be used.

In the present embodiment, the permeability of the printing substrate is judged by the amount of water absorption measured by a dynamic scanning liquid absorption meter. Specifically, a printing substrate having the amount of water absorption of pure water of less than 1 $g/m^2$, measured by the following method at a contact time of 100 msec is referred to as an "impermeable substrate". A printing substrate having the water absorption of 1 $g/m^2$ or more, and less than 6 $g/m^2$ is referred to as a "poorly permeable substrate". A printing substrate having the water absorption of 6 $g/m^2$ or more is referred to as a "permeable substrate".

The water absorption of a printing substrate can be measured, for example, in an environment of 23° C. and RH of 50% using a dynamic scanning liquid absorption meter (for example, "KM500win" manufactured by Kumagai Riki Kogyo Co., Ltd.) set under the following conditions, and using a printing substrate with approximately 15 to 20 cm square as a sample.

Measurement Method: Spiral Scanning (Spiral Method)
Measurement Start Radius: 20 mm
Measurement End Radius: 60 mm
Contact Time: 10 to 1,000 msec
Number of Sampling Points: 19 (Measured at approximately equal intervals with respect to the square root of the contact time)
Scanning Interval: 7 mm
Speed Switching Angle of Rotation Table: 86.3 degrees
Head Box Conditions: Width 5 mm, Slit width 1 mm Examples of permeable substrates include uncoated paper such as coarse paper, medium quality paper, high quality paper, recycled paper; cloth such as cotton, synthetic fiber fabric, silk, hemp, nonwoven fabric; leather, or the like. In particular, uncoated paper such as coarse paper, medium quality paper, high quality paper, recycled paper, or the like can be preferably used from the viewpoint of obtaining printed matter with excellent print quality.

Examples of impermeable or poorly permeable substrates include plastic films and sheets such as polyvinyl chloride sheet, polyethylene terephthalate (PET) film, polypropylene film, polyethylene film, polyethylene sheet, nylon film, nylon sheet, polystyrene film, polystyrene sheet, polyvinyl alcohol film; coated paper such as coarse paper, art paper, cast paper; metals such as aluminum, iron, stainless steel, titanium; glass; or the like.

The printing substrates that are listed may have a smooth surface or an uneven surface. The printing substrates may be transparent, translucent, or opaque. Further, the printing substrate may be a rolled substrate or a sheet substrate. In addition, a printing substrate obtained by bonding two or more kinds of printing substrates listed above to each other may be used. A release adhesive layer or the like may be provided on an opposite side of the printing surface, or an adhesive layer or the like may be provided on a printed surface after printing.

Surface modification such as corona treatment and plasma treatment may be performed on the printing surface of the printing substrates listed above. When the surface modification is performed, the water-based inkjet ink in the present embodiment is suitable in that the wetting and spreading property is improved, the printing image quality and drying property are excellent, and the printed matter having good abrasion resistance and substrate adhesion is obtained along with the uniformity of the printed matter surface.

EXAMPLE

The water-based inkjet ink in the present embodiment will be described in more detail below by giving examples and comparative examples. In the following description, "part" and "%" represent "part by mass" and "% by mass", respectively, unless otherwise specified.

<Production Example of Binder Resin 1>

72.4 parts of 2-butanone was charged into a reaction vessel equipped with a gas introduction tube, a thermometer, a condenser and a stirrer, and substituted with nitrogen gas. The inside of the reaction vessel was heated to 80° C., and a mixture of 15 parts of styrene, 4.5 parts of methacrylic acid, 5.0 parts of 2-hydroxyethyl methacrylate, 20 parts of stearyl methacrylate, 55.5 parts of methyl methacrylate, and 4 parts of V-601 as a polymerization initiator (manufactured by FUJIFILM Wako Pure Chemical Corporation) was added dropwise over 2 hours. After the dropwise addition, the reaction was carried out at 80° C. for 3 hours, 0.6 parts of V-601 were added, and the reaction was continued at 80° C. for another 2 hours to obtain a solution of binder resin 1.

After the solution of binder resin 1 was cooled to 50° C., 4.7 parts of dimethylaminoethanol were added to neutralize the carboxy group, and 140 parts of water were added. Thereafter, the solution was heated to 78° C. or higher, and 2-butanone was distilled away by azeotropy with water, and then adjusted so that the solid content became 30%, thereby obtaining a water-based solution of binder resin 1 (30% solid content).

The mass average molecular weight of the binder resin 1 was about 17,000 when measured using a GPC (HLC-8120GPC manufactured by Tosoh Corporation) equipped with a TSKgel column (manufactured by Tosoh Corporation) and an RI detector, with THF as a developing solvent.

In the present application, the term "water-based solution" refers to a solution containing an aqueous solvent (medium composed of a liquid containing at least water) and components dispersed and/or dissolved in the aqueous solvent.

<Synthesis of Acetylenediol Surfactant 1>

Acetylenediol surfactant 1 was synthesized by using the method described in JP 2001-215690 A, Example 4. Acetylenediol surfactant 1 is a compound in general formula (1) in which $R^1$ is a methyl group, $R^2$ is an isobutyl group, m1+n1 is 5, m2+n2 is 2, and ethylene oxide and propylene oxide groups are added in the form of block type. Acetylene diol surfactant 1 has an HLB value of 7.8 and has a molecular weight of 563.

<Synthesis of Acetylenediol Surfactants 2 to 11>

Acetylenediol surfactants 2 to 11 were synthesized by using the methods described in JP 2001-215690 A, Example 6, and Example 14, and adjusting the amounts of ethylene oxide and propylene oxide used. The structure and HLB value of acetylenediol surfactants 2 to 11 are shown in Table 2.

<Production of Pigment Dispersion Liquid>

450 g of carbon black ("PrinteX 85" manufactured by Orion Engineered Carbons S.A.), 90 g of an acrylic resin (a random polymer of styrene/acrylic acid/behenyl acrylate=45/30/25 (mass ratio), all acid groups neutralized with dimethylaminoethanol, with an acid value of about 230 mgKOH/g and a mass-average molecular weight of 20,000), and 2,460 g of water were charged into a mixing vessel (volume: 10 L) equipped with a stirrer, and agitation (pre-mixing) was performed for 1 hour. Next, circulatory dispersion of the mixture was started using a "Dyno-Mill" manufactured by Shinmaru Enterprises Corporation (volume: 0.6 L) filled with 1,800 g of zirconia beads having a diameter of 0.5 mm. At regular intervals (for example, 1 hour), the D50 of the mixture was measured using the device described above, and the circulatory dispersion was terminated when the D50 becomes 120 nm or less, thereby producing a pigment dispersion liquid.

<Production of Water-Based Inkjet Ink>

Using the pigment dispersion liquid produced by the method described above, each raw material was charged into a mixing vessel equipped with a stirrer so as to obtain the formulation described in each column of Table 3. After the charging, the mixture was heated to 50° C. and further mixed for 1 hour, and then filtered through a membrane filter having a pore size of 0.8 μm to produce water-based inkjet ink 1 to 60.

In manufacturing the water-based inkjet ink, each raw material was charged while stirring the mixture in the mixing vessel. In each column of Table 3, components were charged in the order from the upper row. However, in the case of manufacturing the water-based inkjet ink that did not contain one or more of these components, the next component was charged in the order without charging the one or more of the components. Further, in the case of the component containing two or more raw materials, the charging order within the component was random.

TABLE 2

| Acetylenediol Surfactant No. | Structure illustrated by General Formula (1) | | | | | HLB value | Molecular Weight |
|---|---|---|---|---|---|---|---|
| | R1 | R2 | m1 + n1 | m2 + n2 | Addition Forms | | |
| 2 | methyl group | isobutyl group | 2 | 5 | random | 2.9 | 605 |
| 3 | methyl group | isobutyl group | 3 | 4 | random | 4.4 | 591 |
| 4 | methyl group | isobutyl group | 4 | 3 | random | 6.1 | 577 |
| 5 | methyl group | isobutyl group | 6 | 1 | random | 9.6 | 549 |
| 6 | methyl group | isobutyl group | 3 | 1 | random | 6.3 | 417 |
| 7 | methyl group | isobutyl group | 6 | 4 | random | 7.3 | 723 |
| 8 | methyl group | isobutyl group | 10 | 9 | random | 7.4 | 1190 |
| 9 | methyl group | isobutyl group | 5 | 2 | random | 7.8 | 563 |
| 10 | methyl group | isopentyl group | 5 | 2 | random | 7.5 | 591 |
| 11 | methyl group | isobutyl group | 8 | 1 | random | 11.1 | 637 |

TABLE 3

| Example(Ex.)/Comparative Example(Com. Ex.) No. Water-Based Inkjet Ink No. | | | | | Ex. 1 1 | Ex. 2 2 | Ex. 3 3 | Ex. 4 4 | Ex. 5 5 | Ex. 6 6 | Ex. 7 7 |
|---|---|---|---|---|---|---|---|---|---|---|---|
| Blend amount | Water-soluble organic solvent (B) | Ion-exchanged water | | | 22.45 | 22.45 | 22.45 | 22.45 | 22.45 | 22.45 | 22.45 |
| | | Alkanediol (B1) having 3 to 5 carbon atoms | 1,2-PD | SP value = 13.5 b.p. = 188 | 20 | 20 | 20 | 20 | 20 | 20 | 20 |
| | | | 1,2-BD | SP value = 12.8 b.p. = 191 | | | | | | | |
| | | | 1,3-BD | SP value = 12.8 b.p. = 207 | | | | | | | |
| | | | 1,5-PentD | SP value = 12.4 b.p. = 239 | | | | | | | |
| | | Glycol ether (B2) having 4 to 10 carbon atoms | EB | SP value = 10.8 b.p. = 171 | | | | | | | |
| | | | PM | SP value = 11.3 b.p. = 121 | 5 | 5 | 5 | 5 | 5 | 5 | 5 |
| | | | PE | SP value = 10.9 b.p. = 132 | | | | | | | |
| | | | PnP | SP value = 10.7 b.p. = 150 | | | | | | | |
| | | | PnB | SP value = 10.4 b.p. = 170 | | | | | | | |
| | | | MDG | SP value = 11.2 b.p. = 193 | | | | | | | |
| | | | EDG | SP value = 10.9 b.p. = 202 | | | | | | | |
| | | | BDG | SP value = 10.5 b.p. = 231 | | | | | | | |
| | | | HDG | SP value = 10.2 b.p. = 258 | | | | | | | |
| | | | TEB | SP value = 10.3 b.p. = 278 | | | | | | | |
| | | Other water-soluble organic solvent | Gly | SP value = 16.4 b.p. = 290 | | | | | | | |
| | | | DEG | SP value = 15.0 b.p. = 244 | | | | | | | |
| Surfactant (A) | Acetylenediol surfactant (A1) | Acetylenediol surfactant having a structure of General Formula (1) | Acetylenediol Surfactant 1 | Mw = 563 HLB = 7.8 | 1.5 | | | | | | |
| | | | Acetylenediol Surfactant 2 | Mw = 605 HLB = 2.9 | | 1.5 | | | | | |
| | | | Acetylenediol Surfactant 3 | Mw = 591 HLB = 4.4 | | | 1.5 | | | | |
| | | | Acetylenediol Surfactant 4 | Mw = 577 HLB = 6.1 | | | | 1.5 | | | |
| | | | Acetylenediol Surfactant 5 | Mw = 549 HLB = 9.6 | | | | | 1.5 | | |
| | | | Acetylenediol Surfactant 6 | Mw = 417 HLB = 6.3 | | | | | | 1.5 | |
| | | | Acetylenediol Surfactant 7 | Mw = 723 HLB = 7.3 | | | | | | | 1.5 |
| | | | Acetylenediol Surfactant 8 | Mw = 1190 HLB = 7.4 | | | | | | | |
| | | | Acetylenediol Surfactant 9 | Mw = 563 HLB = 7.8 | | | | | | | |

TABLE 3-continued

| | | | | | Ex. 8 | Ex. 9 | Ex. 10 | Ex. 11 | Ex. 12 | Ex. 13 |
|---|---|---|---|---|---|---|---|---|---|---|
| Nonionic surfactant (A2) | Acetylenediol surfactant (except (A1)) | Acetylenediol Surfactant 10 | Mw = 591 | HLB = 7.5 | | | | | | |
| | | Acetylenediol Surfactant 11 | Mw = 637 | HLB = 11.1 | | | | | | |
| | | Surfynol 440 | Mw = 381 | HLB = 8.1 | 1 | 1 | 1 | 1 | 1 | 1 |
| | | Surfynol 485 | Mw = 1548 | HLB = 17.1 | | | | | | |
| | Siloxane surfactant | TEGO Wet 280 | | | | | | | | |
| | | BYK-3420 | | | | | | | | |
| | | TEGO Glide 100 | | | | | | | | |
| | | TEGO Glide 440 | | | | | | | | |
| Others | Anionic surfactant | Emal 20C | | | | | | | | |
| | Binder resin | Binder Resin 1 | Nv30% | | | | | | | |
| | Pigment dispersion liquid | Pigment dispersion liquid | Nv18% | | 20 | 20 | 20 | 20 | 20 | 20 |
| | Other ingredient (preservative) | Proxel GXL | | | 30 | 30 | 30 | 30 | 30 | 30 |
| Specs | Total Amount | | | | 0.05 | 0.05 | 0.05 | 0.05 | 0.05 | 0.05 |
| | The amount (% by mass) of [siloxane surfactant + acetylenediol surfactant (excluding (A1))] with regard to the amount of acetylenediol surfactant (A1) | | | | 100 | 100 | 100 | 100 | 100 | 100 |
| | The amount (% by mass) of acetylenediol surfactant (excluding (A1)) with regard to the amount of acetylenediol surfactant (A1) | | | | 67 | 67 | 67 | 67 | 67 | 67 |
| | Ratio of the contents, a content of alkanediol (B1) having 3 to 5 carbon atoms/a content of glycol ether (B2) having 4 to 10 carbon atoms | | | | 0 | 0 | 0) | 0 | 0 | 0 |
| | | | | | 4.0 | 4.0 | 4.0 | 4.0 | 4.0 | 4.0 |
| | Energy (times amount) required to evaporate alkanediol (B1) having 3 to 5 carbon atoms with regard to energy required to evaporate glycol ether (B2) having 4 to 10 carbon atoms | | | | 7.0 | 7.0 | 7.0 | 7.0 | 7.0 | 7.0 |
| Evaluation Result | Evaluation 1: Beading | | | | A | B | A | A | B | A |
| | Evaluation 2: Blocking resistance | | | | A | A | A | A | B | A |
| | Evaluation 3: Ejection stability | | | | A | B | B | A | A | A |
| Example(Ex.)/Comparative Example(Com. Ex.) No. | | | | | Ex. 8 | Ex. 9 | Ex. 10 | Ex. 11 | Ex. 12 | Ex. 13 |
| Water-Based Inkjet Ink No. | | | | | 8 | 9 | 10 | 11 | 12 | 13 |
| Blend amount | Ion-exchanged water | | | | 22.45 | 22.45 | 22.45 | 23.45 | 21.95 | 21.95 |
| | Water-soluble organic solvent (B) | Alkanediol (B1) having 3 to 5 carbon atoms | 1,2-PD | SP value = 13.5 b.p. = 188 | 20 | 20 | 20 | 20 | 20 | 20 |
| | | | 1,2-BD | SP value = 12.8 b.p. = 191 | | | | | | |
| | | | 1,3-BD | SP value = 12.8 b.p. = 207 | | | | | | |
| | | | 1,5-PentD | SP value = 12.4 b.p. = 239 | | | | | | |
| | | Glycol ether (B2) having 4 to 10 carbon atoms | EB | SP value = 10.8 b.p. = 171 | 5 | 5 | 5 | 5 | 5 | 5 |
| | | | PM | SP value = 11.3 b.p. = 121 | | | | | | |
| | | | PE | SP value = 10.9 b.p. = 132 | | | | | | |
| | | | PnP | SP value = 10.7 b.p. = 150 | | | | | | |
| | | | PnB | SP value = 10.4 b.p. = 170 | | | | | | |
| | | | MDG | SP value = 11.2 b.p. = 193 | | | | | | |
| | | | EDG | SP value = 10.9 b.p. = 202 | | | | | | |
| | | | BDG | SP value = 10.5 b.p. = 231 | | | | | | |

TABLE 3-continued

| | | | | | | | | | | | |
|---|---|---|---|---|---|---|---|---|---|---|---|
| Surfactant (A) | Acetylenediol surfactant (A1) | Other water-soluble organic solvent | HDG | SP value = 10.2 | b.p. = 258 | | | | | | |
| | | | TEB | SP value = 10.3 | b.p. = 278 | | | | | | |
| | | | Gly | SP value = 16.4 | b.p. = 290 | | | | | | |
| | | | DEG | SP value = 15.0 | b.p. = 244 | | | | | | |
| | | Acetylenediol surfactant having a structure of General Formula (1) | Acetylenediol Surfactant 1 | Mw = 563 | HLB = 7.8 | | | | 1.5 | | 1.5 |
| | | | Acetylenediol Surfactant 2 | Mw = 605 | HLB = 2.9 | | | | | | |
| | | | Acetylenediol Surfactant 3 | Mw = 591 | HLB = 4.4 | | | | | | |
| | | | Acetylenediol Surfactant 4 | Mw = 577 | HLB = 6.1 | | | | | | |
| | | | Acetylenediol Surfactant 5 | Mw = 549 | HLB = 9.6 | | | | | | |
| | | | Acetylenediol Surfactant 6 | Mw = 417 | HLB = 6.3 | | | | | | |
| | | | Acetylenediol Surfactant 7 | Mw = 723 | HLB = 7.3 | 1.5 | | | | | |
| | | | Acetylenediol Surfactant 8 | Mw = 1190 | HLB = 7.4 | | 1.5 | | | | |
| | | | Acetylenediol Surfactant 9 | Mw = 563 | HLB = 7.8 | | | 1.5 | | | |
| | | | Acetylenediol Surfactant 10 | Mw = 591 | HLB = 7.5 | | | | | | |
| | | | Acetylenediol Surfactant 11 | Mw = 637 | HLB = 11.1 | | | | | | |
| | Nonionic surfactant (A2) | Acetylenediol surfactant (except (A1)) | Surfynol 440 | Mw = 381 | HLB = 8.1 | | | | | | |
| | | | Surfynol 485 | Mw = 1548 | HLB = 17.1 | | | | | 1.5 | |
| Others | | Siloxane surfactant | TEGO Wet 280 | | | 1 | 1 | | | | |
| | | | BYK-3420 | | | | | | | | |
| | | | TEGO Glide 100 | | | | | | | | |
| | | | TEGO Glide 440 | | | | | | | | |
| | | Anionic surfactant | Emal 20C | | | | | | | | |
| | Binder resin | | Binder Resin 1 | Nv30% | | 20 | 20 | 20 | 20 | 20 | 20 |
| | Pigment dispersion liquid | | Pigment dispersion liquid | Nv18% | | 30 | 30 | 30 | 30 | 30 | 30 |
| | Other ingredient (preservative) | | Proxel GXL | | | 0.05 | 0.05 | 0.05 | 0.05 | 0.05 | 0.05 |
| | Total Amount | | | | | 100 | 100 | 100 | 100 | 100 | 100 |
| Specs | The amount (% by mass) of [siloxane surfactant + acetylenediol surfactant (excluding (A1))] with regard to the amount of acetylenediol surfactant (A1) | | | | | 67 | 67 | 0 | 0 | 0 | 0 |
| | The amount (% by mass) of acetylenediol surfactant (excluding (A1)) with regard to the amount of acetylenediol surfactant (A1) | | | | | 0 | 0 | 0 | 0 | 100 | 100 |
| | Ratio of the contents, a content of alkanediol (B1) having 3 to 5 carbon atoms/a content of glycol ether (B2) having 4 to 10 carbon atoms | | | | | 4.0 | 4.0 | 4.0 | 4.0 | 4.0 | 4.0 |
| | Energy (times amount) required to evaporate alkanediol (B1) having 3 to 5 carbon atoms with regard to energy required to evaporate glycol ether (B2) having 4 to 10 carbon atoms | | | | | 7.0 | 7.0 | 7.0 | 7.0 | 7.0 | 7.0 |
| Evaluation Result | Evaluation 1: Beading | | | | | B | B | A | A | B | B |
| | Evaluation 2: Blocking resistance | | | | | A | A | A | A | B | B |
| | Evaluation 3: Ejection stability | | | | | A | A | A | A | B | A |

TABLE 3-continued

| Blend amount | Example(Ex.)/Comparative Example(Com. Ex.) No. Water-Based Inkjet Ink No. | | | | | | Ex. 14 14 | Ex. 15 15 | Ex. 16 16 | Ex. 17 17 | Ex. 18 18 | Ex. 19 19 | Ex. 20 20 | Ex. 21 21 |
|---|---|---|---|---|---|---|---|---|---|---|---|---|---|---|
| | Ion-exchanged water | | | | | | 21.45 | 22.45 | 23.25 | 23.25 | 23.05 | 21.95 | 21.95 | 22.75 |
| Water-soluble organic solvent (B) | Alkanediol (B1) having 3 to 5 carbon atoms | 1,2-PD | | SP value = 13.5 | b.p. = 188 | | 20 | 20 | 20 | 20 | 20 | 20 | 20 | 20 |
| | | 1,2-BD | | SP value = 12.8 | b.p. = 191 | | | | | | | | | |
| | | 1,3-BD | | SP value = 12.8 | b.p. = 207 | | | | | | | | | |
| | | 1,5-PentD | | SP value = 12.4 | b.p. = 239 | | | | | | | | | |
| | Glycol ether (B2) having 4 to 10 carbon atoms | EB | | SP value = 10.8 | b.p. = 171 | | 5 | 5 | 5 | 5 | 5 | 5 | 5 | 5 |
| | | PM | | SP value = 11.3 | b.p. = 121 | | | | | | | | | |
| | | PE | | SP value = 10.9 | b.p. = 132 | | | | | | | | | |
| | | PnP | | SP value = 10.7 | b.p. = 150 | | | | | | | | | |
| | | PnB | | SP value = 10.4 | b.p. = 170 | | | | | | | | | |
| | | MDG | | SP value = 11.2 | b.p. = 193 | | | | | | | | | |
| | | EDG | | SP value = 10.9 | b.p. = 202 | | | | | | | | | |
| | | BDG | | SP value = 10.5 | b.p. = 231 | | | | | | | | | |
| | | HDG | | SP value = 10.2 | b.p. = 258 | | | | | | | | | |
| | | TEB | | SP value = 10.3 | b.p. = 278 | | | | | | | | | |
| | | Gly | | SP value = 16.4 | b.p. = 290 | | | | | | | | | |
| | Other water-soluble organic solvents | DEG | | SP value = 15.0 | b.p. = 244 | | | | | | | | | |
| Surfactant (A) | Acetylenediol surfactant (A1) | Acetylenediol surfactant having a structure of General Formula (1) | Acetylenediol Surfactant 1 | Mw = 563 | HLB = 7.8 | | 1.5 | 1.5 | 1.5 | 1.5 | 1.5 | 1.5 | 1.5 | 1.5 |
| | | | Acetylenediol Surfactant 2 | Mw = 605 | HLB = 2.9 | | | | | | | | | |
| | | | Acetylenediol Surfactant 3 | Mw = 591 | HLB = 4.4 | | | | | | | | | |
| | | | Acetylenediol Surfactant 4 | Mw = 577 | HLB = 6.1 | | | | | | | | | |
| | | | Acetylenediol Surfactant 5 | Mw = 549 | HLB = 9.6 | | | | | | | | | |
| | | | Acetylenediol Surfactant 6 | Mw = 417 | HLB = 6.3 | | | | | | | | | |
| | | | Acetylenediol Surfactant 7 | Mw = 723 | HLB = 7.3 | | | | | | | | | |
| | | | Acetylenediol Surfactant 8 | Mw = 1190 | HLB = 7.4 | | | | | | | | | |
| | | | Acetylenediol Surfactant 9 | Mw = 563 | HLB = 7.8 | | | | | | | | | |
| | | | Acetylenediol Surfactant 10 | Mw = 591 | HLB = 7.5 | | | | | | | | | |

TABLE 3-continued

| | | | | | | | | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|---|---|---|---|---|
| Nonionic surfactant (A2) | Acetylenediol surfactant (except (A1)) | Acetylenediol Surfactant 11 | Mw = 637 | HLB = 11.1 | | | | | | | | | | | | |
| | | Surfynol 440 | Mw = 381 | HLB = 8.1 | | | | | | | | | | | 1 | |
| | | Surfynol 485 | Mw = 1548 | HLB = 17.1 | | | 1 | | | | | | | | | |
| | Siloxane surfactant | | | | TEGO Wet 280 | | | | | | | | | | | |
| | | | | | BYK-3420 | | | 1 | | | | | | | | |
| | | | | | TEGO Glide 100 | | | | | | | | 0.5 | 0.5 | 0.5 | 0.5 |
| | | | | | TEGO Glide 440 | | | | | | | | | | | 0.2 |
| Others | Anionic surfactant | | | | Emal 20 C | | | | | | 0.4 | | | | | |
| | Binder resin | | | | Binder Resin 1 | Nv30% | | | 0.2 | 0.2 | | | | | | |
| | Pigment dispersion liquid | | | | Pigment dispersion liquid | Nv18% | | 20 | 20 | 20 | 20 | 20 | 20 | 20 | 20 | 20 |
| | Other ingredient (preservative) | | | | Proxel GXL | | | 30 | 30 | 30 | 30 | 30 | 30 | 30 | 30 | 30 |
| Specs | Total Amount | | | | | | | 0.05 | 0.05 | 0.05 | 0.05 | 0.05 | 0.05 | 0.05 | 0.05 | 0.05 |
| | The amount (% by mass) of [siloxane surfactant + acetylenediol surfactant (excluding (A1))] with regard to the amount of acetylenediol surfactant (A1) | | | | | | | 100 | 100 | 100 | 100 | 100 | 100 | 100 | 100 | 100 |
| | The amount (% by mass) of acetylenediol surfactant (excluding (A1)) with regard to the amount of acetylenediol surfactant (A1) | | | | | | | 133 | 67 | 13 | 13 | 0 | 100 | 100 | 100 | 47 |
| | Ratio of the contents, a content of alkanediol (B1) having 3 to 5 carbon atoms/a content of glycol ether (B2) having 4 to 5 carbon atoms | | | | | | | 67 | 0 | 0 | 0 | 33 | 33 | 33 | 33 | 33 |
| | | | | | | | | 4.0 | 4.0 | 4.0 | 4.0 | 4.0 | 4.0 | 4.0 | 4.0 | 4.0 |
| | Energy (times amount) required to evaporate alkanediol (B1) having 3 to 5 carbon atoms with regard to energy required to evaporate glycol ether (B2) having 4 to 10 carbon atoms | | | | | | | 7.0 | 7.0 | 7.0 | 7.0 | 7.0 | 7.0 | 7.0 | 7.0 | 7.0 |
| Evaluation Result | Evaluation 1: Beading | | | | | | | A | A | A | B | A | A | A | A | A |
| | Evaluation 2: Blocking resistance | | | | | | | A | A | A | B | A | A | A | A | A |
| | Evaluation 3: Ejection stability | | | | | | | AA | B | B | B | AA | AA | AA | AA | AA |
| | Example(Ex.)/Comparative Example(Com. Ex.) No. | | | | | | | Ex. 22 | Ex. 23 | Ex. 24 | Ex. 25 | Ex. 26 | Ex. 27 | Ex. 28 | Ex. 29 | Ex. 30 |
| | Water-Based Inkjet Ink No. | | | | | | | 22 | 23 | 24 | 25 | 26 | 27 | 28 | 29 | 30 |
| Blend amount | Ion-exchanged water | | | | | | | 22.75 | 22.55 | 21.75 | 21.75 | 21.75 | 21.75 | 21.75 | 21.75 | 21.75 |
| | Water-soluble organic solvent (B) | Alkanediol (B1) having 3 to 5 carbon atoms | 1,2-PD | SP value = 13.5 | b.p. = 188 | | | 20 | 20 | 20 | 20 | 20 | 20 | 20 | 20 | 20 |
| | | | 1,2-BD | SP value = 12.8 | b.p. = 191 | | | | | | | | | | | |
| | | | 1,3-BD | SP value = 12.8 | b.p. = 207 | | | | | | | | | | | |
| | | | 1,5-PentD | SP value = 12.4 | b.p. = 239 | | | | | | | | | | | |
| | | Glycol ether (B2) having 4 to 10 carbon atoms | EB | SP value = 10.8 | b.p. = 171 | | | 5 | 5 | 5 | 5 | 5 | 5 | 5 | 5 | 5 |
| | | | PM | SP value = 11.3 | b.p. = 121 | | | | | | | | | | | |
| | | | PE | SP value = 10.9 | b.p. = 132 | | | | | | | | | | | |
| | | | PnP | SP value = 10.7 | b.p. = 150 | | | | | | | | | | | |
| | | | PnB | SP value = 10.4 | b.p. = 170 | | | | | | | | | | | |
| | | | MDG | SP value = 11.2 | b.p. = 193 | | | | | | | | | | | |
| | | | EDG | SP value = 10.9 | b.p. = 202 | | | | | | | | | | | |
| | | | BDG | SP value = 10.5 | b.p. = 231 | | | | | | | | | | | |
| | | | HDG | SP value = 10.2 | b.p. = 258 | | | | | | | | | | | |
| | | | TEB | SP value = 10.3 | b.p. = 278 | | | | | | | | | | | |

TABLE 3-continued

| | | | Gly<br>DEG | SP value = 16.4 b.p. = 290<br>SP value = 15.0 b.p. = 244 | | | | | | | | | | | |
|---|---|---|---|---|---|---|---|---|---|---|---|---|---|---|---|
| Surfactant (A) | Acetylenediol surfactant (A1) | Acetylenediol surfactant having a structure of General Formula (1) | Acetylenediol Surfactant 1 | Mw = 563 | HLB = 7.8 | 1.5 | 1.5 | 1.5 | 1.5 | 1.5 | 1.5 | 1.5 | | | | |
| | | | Acetylenediol Surfactant 2 | Mw = 605 | HLB = 2.9 | | | | | | | | 1.5 | | | |
| | | | Acetylenediol Surfactant 3 | Mw = 591 | HLB = 4.4 | | | | | | | | | | | |
| | | | Acetylenediol Surfactant 4 | Mw = 577 | HLB = 6.1 | | | | | | | | | | | |
| | | | Acetylenediol Surfactant 5 | Mw = 549 | HLB = 9.6 | | | | | | | | | | | |
| | | | Acetylenediol Surfactant 6 | Mw = 417 | HLB = 6.3 | | | | | | | | | | | |
| | | | Acetylenediol Surfactant 7 | Mw = 723 | HLB = 7.3 | | | | | | | | | | | |
| | | | Acetylenediol Surfactant 8 | Mw = 1190 | HLB = 7.4 | | | | | | | | | | | |
| | | | Acetylenediol Surfactant 9 | Mw = 563 | HLB = 7.8 | | | | | | | | | | 1.5 | |
| | | | Acetylenediol Surfactant 10 | Mw = 591 | HLB = 7.5 | | | | | | | | | | | |
| | | | Acetylenediol Surfactant 11 | Mw = 637 | HLB = 11.1 | | | | | | | | | | | 1.5 |
| | | Acetylenediol surfactant (except (A1)) | Surfynol 440 | Mw = 381 | HLB = 8.1 | 0.5 | 0.5 | 0.5 | 0.5 | 0.5 | 0.5 | 0.5 | 0.5 | 0.5 | 0.5 | 0.5 |
| | | | Surfynol 485 | Mw = 1548 | HLB = 17.1 | 0.5 | | | | | | | | | | |
| | Nonionic surfactant (A2) | Siloxane surfactant | TEGO Wet 280 | | | | 1 | 1 | 1 | 1 | 1 | | | 1 | 1 | 1 |
| | | | BYK-3420 | | | | | | | | | 1 | | | | |
| | | | TEGO Glide 100 | | | | 0.2 | 0.2 | 0.2 | 0.2 | 0.2 | | 0.2 | 0.2 | 0.2 | 0.2 |
| | | | TEGO Glide 440 | | | | | | | | | 0.2 | | | | |
| Others | Anionic surfactant | | Emal 20 C | | | 0.2 | | | | | | | | | | |
| | | | | | | 0.4 | | | | | | | | | | |
| Binder resin | | | Binder Resin 1 | Nv30% | | 20 | 20 | 20 | 20 | 20 | 20 | 20 | 20 | 20 | 20 | 20 |
| Pigment dispersion liquid | | | Pigment dispersion liquid | Nv18% | | 30 | 30 | 30 | 30 | 30 | 30 | 30 | 30 | 30 | 30 | 30 |
| Other ingredient (preservative) | | | Proxel GXL | | | 0.05 | 0.05 | 0.05 | 0.05 | 0.05 | 0.05 | 0.05 | 0.05 | 0.05 | 0.05 | 0.05 |
| Total Amount | | | | | | 100 | 100 | 100 | 100 | 100 | 100 | 100 | 100 | 100 | 100 | 100 |

TABLE 3-continued

| Specs | | | Ex. 31 | Ex. 32 | Ex. 33 | Ex. 34 | Ex. 35 | Ex. 36 | Ex. 37 |
|---|---|---|---|---|---|---|---|---|---|
| The amount (% by mass) of [siloxane surfactant + acetylenediol surfactant (excluding (A1)] with regard to the amount of acetylenediol surfactant (A1) | | | 47 | 33 | 33 | 33 | 33 | 33 | 33 |
| The amount (% by mass) of acetylenediol surfactant (excluding (A1)) with regard to the amount of acetylenediol surfactant (A1) | | | 33 | 33 | 33 | 33 | 33 | 33 | 33 |
| Ratio of the contents, a content of alkanediol (B1) having 3 to 5 carbon atoms/a content of glycol ether (B2) having 4 to 10 carbon atoms | | | 4.0 | 4.0 | 4.0 | 4.0 | 4.0 | 4.0 | 4.0 |
| Energy (times amount) required to evaporate alkanediol (B1) having 3 to 5 carbon atoms with regard to energy required to evaporate glycol ether (B2) having 4 to 10 carbon atoms | | | 7.0 | 7.0 | 7.0 | 7.0 | 7.0 | 7.0 | 7.0 |

| Evaluation Result | Ex. 31 | Ex. 32 | Ex. 33 | Ex. 34 | Ex. 35 | Ex. 36 | Ex. 37 |
|---|---|---|---|---|---|---|---|
| Evaluation 1: Beading | A | A | A | AA | AA | AA | A |
| Evaluation 2: Blocking resistance | AA | AA | A | AA | AA | AA | A |
| Evaluation 3: Ejection stability | AA | AA | B | AA | AA | AA | AA |

| Blend amount | | | | Ex. 31 | Ex. 32 | Ex. 33 | Ex. 34 | Ex. 35 | Ex. 36 | Ex. 37 |
|---|---|---|---|---|---|---|---|---|---|---|
| | Ion-exchanged water | | | 21.75 | 21.75 | 21.75 | 21.75 | 21.75 | 21.75 | 21.75 |
| Water-soluble organic solvent (B) | Alkanediol (B1) having 3 to 5 carbon atoms | 1,2-PD | b.p. = 188 SP value = 13.5 | 20 | | | | | | |
| | | 1,2-BD | b.p. = 191 SP value = 12.8 | | 20 | | | | | |
| | | 1,3-BD | b.p. = 207 SP value = 12.8 | | | 20 | | | | |
| | | 1,5-PentD | b.p. = 239 SP value = 12.4 | | | | 20 | | | |
| | Glycol ether (B2) having 4 to 10 carbon atoms | EB | b.p. = 171 SP value = 10.8 | 5 | 5 | 5 | 5 | | | |
| | | PM | b.p. = 121 SP value = 11.3 | | | | | 5 | | |
| | | PE | b.p. = 132 SP value = 10.9 | | | | | | | |
| | | PnP | b.p. = 150 SP value = 10.7 | | | | | | 5 | |
| | | PnB | b.p. = 170 SP value = 10.4 | | | | | | | 5 |
| | | MDG | b.p. = 193 SP value = 11.2 | | | | | | | |
| | | EDG | b.p. = 202 SP value = 10.9 | | | | | | | |
| | | BDG | b.p. = 231 SP value = 10.5 | | | | | | | |
| | | HDG | b.p. = 258 SP value = 10.2 | | | | | | | |
| | | TEB | b.p. = 278 SP value = 10.3 | | | | | | | |
| | Other water-soluble organic | Gly | b.p. = 290 SP value = 16.4 | | | | | | | |
| | | DEG | b.p. = 244 SP value = 15.0 | | | | | | | |
| Surfactant (A) | Acetylenediol surfactant (A1) | Acetylenediol surfactant having a structure of general formula (1) | | 1.5 | 1.5 | 1.5 | 1.5 | 1.5 | 1.5 | 1.5 |
| | | Acetylenediol Surfactant 1 | Mw = 563 HLB = 7.8 | | | | | | | |
| | | Acetylenediol Surfactant 2 | Mw = 605 HLB = 2.9 | | | | | | | |
| | | Acetylenediol Surfactant 3 | Mw = 591 HLB = 4.4 | | | | | | | |
| | | Acetylenediol Surfactant 4 | Mw = 577 HLB = 6.1 | | | | | | | |
| | | Acetylenediol Surfactant 5 | Mw = 549 HLB = 9.6 | | | | | | | |
| | | Acetylenediol Surfactant 6 | Mw = 417 HLB = 6.3 | | | | | | | |
| | | Acetylenediol Surfactant 7 | Mw = 723 HLB = 7.3 | | | | | | | |
| | | Acetylenediol Surfactant 8 | Mw = 1190 HLB = 7.4 | | | | | | | |

TABLE 3-continued

| | | | | | Ex. 38 | Ex. 39 | Ex. 40 | Ex. 41 | Ex. 42 | Ex. 43 | Ex. 44 | Ex. 45 |
|---|---|---|---|---|---|---|---|---|---|---|---|---|
| | Nonionic surfactant (A2) | Acetylenediol surfactant (except (A1)) | Acetylenediol Surfactant 9 | Mw = 563 HLB = 7.8 | | | | | | | | |
| | | | Acetylenediol Surfactant 10 | Mw = 591 HLB = 7.5 | | | | | | | | |
| | | | Acetylenediol Surfactant 11 | Mw = 637 HLB = 11.1 | | | | | | | | |
| | | | Surfynol 440 | Mw = 381 HLB = 8.1 | | | | | | | | |
| | | | Surfynol 485 | Mw = 1548 HLB = 17.1 | 0.5 | 0.5 | 0.5 | 0.5 | 0.5 | 0.5 | 0.5 | 0.5 |
| | | Siloxane surfactant | TEGO Wet 280 | | 1 | 1 | 1 | 1 | 1 | 1 | 1 | 1 |
| | | | BYK-3420 | | | | | | | | | |
| | | | TEGO Glide 100 | | | | | | | | | |
| | | | TEGO Glide 440 | | | | | | | | | |
| | Other | Anionic surfactant | Emal 20 C | | | | | | | | | |
| | Binder resin | Binder Resin 1 | | Nv30% | 0.2 | 0.2 | 0.2 | 0.2 | 0.2 | 0.2 | 0.2 | 0.2 |
| | Pigment dispersion liquid | Pigment dispersion liquid | | Nv18% | 20 | 20 | 20 | 20 | 20 | 20 | 20 | 20 |
| | Other ingredient (preservative) | Proxel GXL | | | 30 | 30 | 30 | 30 | 30 | 30 | 30 | 30 |
| | | | | | 0.05 | 0.05 | 0.05 | 0.05 | 0.05 | 0.05 | 0.05 | 0.05 |
| | Total Amount | | | | 100 | 100 | 100 | 100 | 100 | 100 | 100 | 100 |
| Specs | The amount (% by mass) of [siloxane surfactant + acetylenediol surfactant (excluding (A1))] with regard to the amount of acetylenediol surfactant (A1) | | | | 113 | 113 | 113 | 113 | 113 | 113 | 113 | 113 |
| | The amount (% by mass) of acetylenediol surfactant (excluding (A1)) with regard to the amount of acetylenediol surfactant (A1) | | | | 33 | 33 | 33 | 33 | 33 | 33 | 33 | 33 |
| | Ratio of the contents, a content of alkanediol (B1) having 3 to 5 carbon atoms/a content of glycol ether (B2) having 4 to 10 carbon atoms | | | | 4.0 | 4.0 | 4.0 | 4.0 | 4.0 | 4.0 | 4.0 | 4.0 |
| | Energy (times amount) required to evaporate alkanediol (B1) having 3 to 5 carbon atoms with regard to energy required to evaporate glycol ether (B2) having 4 to 10 carbon atoms | | | | 6.9 | 7.6 | 8.4 | 4.9 | 6.4 | 5.6 | 4.8 | 2 |
| Evaluation Result | Evaluation 1: Beading | | | | AA | AA | AA | A | AA | A | A | A |
| | Evaluation 2: Blocking resistance | | | | AA | A | A | AA | AA | AA | AA | AA |
| | Evaluation 3: Ejection stability | | | | AA | AA | AA | A | AA | A | A | A |
| | Example(Ex.)/Comparative Example(Com. Ex.) No. | | | | Ex. 38 | Ex. 39 | Ex. 40 | Ex. 41 | Ex. 42 | Ex. 43 | Ex. 44 | Ex. 45 |
| | Water-Based Inkjet Ink No. | | | | 38 | 39 | 40 | 41 | 42 | 43 | 44 | 45 |
| Blend amount | Ion-exchanged water | | | | 21.75 | 21.75 | 21.75 | 21.75 | 21.75 | 21.75 | 21.75 | 21.75 |
| | Water-soluble organic solvent (B) | Alkanediol (B1) having 3 to 5 carbon atoms | 1,2-PD | SP value = 13.5 b.p. = 188 | 20 | 20 | 20 | 20 | 20 | | 15 | 23 |
| | | | 1,2-BD | SP value = 12.8 b.p. = 191 | | | | | | 12 | | |
| | | | 1,3-BD | SP value = 12.8 b.p. = 207 | | | | | | | | |
| | | | 1,5-PentD | SP value = 12.4 b.p. = 239 | | | | | | | | |
| | | Glycol ether (B2) having 4 to 10 carbon atoms | EB | SP value = 10.8 b.p. = 171 | 5 | 5 | | | | | | |
| | | | PM | SP value = 11.3 b.p. = 121 | | | 5 | | | | | |
| | | | PE | SP value = 10.9 b.p. = 132 | | | | 5 | | | | |
| | | | PnP | SP value = 10.7 b.p. = 150 | | | | | 5 | | | |
| | | | PnB | SP value = 10.4 b.p. = 170 | | | | | | 13 | 10 | 2 |
| | | | MDG | SP value = 11.2 b.p. = 193 | | | | | | | | |
| | | | EDG | SP value = 10.9 b.p. = 202 | | | | | | | | |
| | | | BDG | SP value = 10.5 b.p. = 231 | | | | | | | | |
| | | | HDG | SP value = 10.2 b.p. = 258 | | | | | | | | |
| | | | TEB | SP value = 10.3 b.p. = 278 | | | | | | | | |
| | | Other water-soluble organic | Gly | SP value = 16.4 b.p. = 290 | | | | | | | | |
| | | | DEG | SP value = 15.0 b.p. = 244 | | | | | | | | |

TABLE 3-continued

| | | | | | | | | | | | |
|---|---|---|---|---|---|---|---|---|---|---|---|
| Surfactant (A) | Acetylenediol surfactant (A1) | Acetylenediol surfactant having a structure of general formula (1) | Acetylenediol Surfactant 1 | Mw = 563 | HLB = 7.8 | 1.5 | 1.5 | 1.5 | 1.5 | 1.5 | 1.5 | 1.5 | 1.5 |
| | | | Acetylenediol Surfactant 2 | Mw = 605 | HLB = 2.9 | | | | | | | | |
| | | | Acetylenediol Surfactant 3 | Mw = 591 | HLB = 4.4 | | | | | | | | |
| | | | Acetylenediol Surfactant 4 | Mw = 577 | HLB = 6.1 | | | | | | | | |
| | | | Acetylenediol Surfactant 5 | Mw = 549 | HLB = 9.6 | | | | | | | | |
| | | | Acetylenediol Surfactant 6 | Mw = 417 | HLB = 6.3 | | | | | | | | |
| | | | Acetylenediol Surfactant 7 | Mw = 723 | HLB = 7.3 | | | | | | | | |
| | | | Acetylenediol Surfactant 8 | Mw = 1190 | HLB = 7.4 | | | | | | | | |
| | | | Acetylenediol Surfactant 9 | Mw = 563 | HLB = 7.8 | | | | | | | | |
| | | | Acetylenediol Surfactant 10 | Mw = 591 | HLB = 7.5 | | | | | | | | |
| | | | Acetylenediol Surfactant 11 | Mw = 637 | HLB = 11.1 | | | | | | | | |
| | Nonionic surfactant (A2) | Acetylenediol surfactant (except (A1)) | Surfynol 440 | Mw = 381 | HLB = 8.1 | 0.5 | 0.5 | 0.5 | 0.5 | 0.5 | 0.5 | 0.5 | 0.5 |
| | | | Surfynol 485 | Mw = 1548 | HLB = 17.1 | | | | | | | | |
| | | Siloxane surfactant | TEGO Wet 280 | | | 1 | 1 | 1 | 1 | 1 | 1 | 1 | 1 |
| | | | BYK-3420 | | | | | | | | | | |
| | | | TEGO Glide 100 | | | | | | | | | | |
| | | | TEGO Glide 440 | | | | | | | | | | |
| | Other | Anionic surfactant | Emal 20 C | | | 0.2 | 0.2 | 0.2 | 0.2 | 0.2 | 0.2 | 0.2 | 0.2 |
| Binder resin | | | Binder Resin 1 | Nv 30% | | 20 | 20 | 20 | 20 | 20 | 20 | 20 | 20 |
| Pigment dispersion liquid | | | Pigment dispersion liquid | Nv 18% | | 30 | 30 | 30 | 30 | 30 | 30 | 30 | 30 |
| Other ingredient (preservative) | | | Proxel GXL | | | 0.05 | 0.05 | 0.05 | 0.05 | 0.05 | 0.05 | 0.05 | 0.05 |
| Total Amount | | | | | | 100 | 100 | 100 | 100 | 100 | 100 | 100 | 100 |
| Specs | The amount (% by mass) of [siloxane surfactant + acetylenediol surfactant (A1) (excluding (A1))] with regard to the amount of acetylenediol surfactant (A1) | | | | | 113 | 113 | 113 | 113 | 113 | 113 | 113 | 113 |
| | The amount (% by mass) of acetylenediol surfactant (excluding (A1)) with regard to the amount of acetylenediol surfactant (A1) | | | | | 33 | 33 | 33 | 33 | 33 | 33 | 33 | 33 |
| | Ratio of the contents, a content of alkanediol (B1) having 3 to 5 carbon atoms/a content of glycol ether (B2) having 4 to 10 carbon atoms | | | | | 4.0 | 4.0 | 4.0 | 4.0 | 4.0 | 0.92 | 4.0 | 11.5 |
| | Energy (times amount) required to evaporate alkanediol (B1) having 3 to 5 carbon atoms with regard to energy required to evaporate glycol ether (B2) having 4 to 10 carbon atoms | | | | | 4.3 | 4.1 | 3.6 | 3.2 | 4.0 | 1.6 | 2.6 | 20.1 |
| Evaluation Result | Evaluation 1: Beading | | | | | A | A | B | B | B | A | A | B |
| | Evaluation 2: Blocking resistance | | | | | AA | AA | AA | A | A | AA | AA | B |
| | Evaluation 3: Ejection stability | | | | | AA | AA | A | A | B | A | A | A |

TABLE 3-continued

| Blend amount | | | Example(Ex.)/Comparative Example(Com. Ex.) No. Water-Based Inkjet Ink No. | | Ex. 46 46 | Ex. 47 47 | Ex. 48 48 | Ex. 49 49 | Ex. 50 50 | Ex. 51 51 |
|---|---|---|---|---|---|---|---|---|---|---|
| | Water-soluble organic solvent (B) | | Ion-exchanged water | | 23.17 | 23.05 | 22.75 | 21.25 | 18.25 | 17.25 |
| | | Alkanediol (B1) having 3 to 5 carbon atoms | 1,2-PD | SP value = 13.5 | 20 | 20 | 20 | 20 | 20 | 20 |
| | | | 1,2-BD | SP value = 12.8 | | | | | | |
| | | | 1,3-BD | SP value = 12.8 | | | | | | |
| | | | 1,5-PentD | SP value = 12.4 | | | | | | |
| | | Glycol ether (B2) having 4 to 10 carbon atoms | EB | SP value = 10.8 | | | | | | |
| | | | PM | SP value = 11.3 | 5 | 5 | 5 | 5 | 5 | 5 |
| | | | PE | SP value = 10.9 | | | | | | |
| | | | PnP | SP value = 10.7 | | | | 5 | 5 | |
| | | | PnB | SP value = 10.4 | | | | | | |
| | | Other water-soluble organic solvent | MDG | SP value = 11.2 | | | | | | |
| | | | EDG | SP value = 10.9 | | | | | | |
| | | | BDG | SP value = 10.5 | | | | | | |
| | | | HDG | SP value = 10.2 | | | | | 5 | |
| | | | TEB | SP value = 10.3 | | | | | | |
| | | | Gly | SP value = 16.4 | | | | | | |
| | | | DEG | SP value = 15.0 | | | | | | |
| Surfactant (A) | Acetylenediol surfactant (A1) | Acetylenediol surfactant having a structure of General Formula (1) | Acetylenediol Surfactant 1 | Mw = 563 | 0.08 | 0.2 | 0.5 | 2 | 5 | 6 |
| | | | Acetylenediol Surfactant 2 | Mw = 605 | | | | | | |
| | | | Acetylenediol Surfactant 3 | Mw = 591 | | | | | | |
| | | | Acetylenediol Surfactant 4 | Mw = 577 | | | | | | |
| | | | Acetylenediol Surfactant 5 | Mw = 549 | | | | | | |
| | | | Acetylenediol Surfactant 6 | Mw = 417 | | | | | | |
| | | | Acetylenediol Surfactant 7 | Mw = 723 | | | | | | |
| | | | Acetylenediol Surfactant 8 | Mw = 1190 | | | | | | |
| | | | Acetylenediol Surfactant 9 | Mw = 563 | | | | | | |
| | | | Acetylenediol Surfactant 10 | Mw = 591 | | | | | | |

TABLE 3-continued

| | | | | Com. Ex. 1 52 | Com. Ex. 2 53 | Com. Ex. 3 54 | Com. Ex. 4 55 | Com. Ex. 5 56 | Com. Ex. 6 57 | Com. Ex. 7 58 | Com. Ex. 8 59 | Com. Ex. 9 60 |
|---|---|---|---|---|---|---|---|---|---|---|---|---|
| Nonionic surfactants (A2) | Acetylenediol surfactant (except (A1)) | Acetylenediol Surfactant 11 | Mw = 637, HLB = 11.1 | 0.5 | | | | | | | | |
| | | Surfynol 440 | Mw = 381, HLB = 8.1 | | 0.5 | | | | | | | |
| | | Surfynol 485 | Mw = 1548, HLB = 17.1 | | | 0.5 | 0.5 | 0.5 | 0.5 | 0.5 | 0.5 | 0.5 |
| | Siloxane surfactant | TEGO Wet 280 | | 1 | | | | | | | | |
| | | BYK-3420 | | | 1 | | | | | | | |
| | | TEGO Glide 100 | | | | 1 | 1 | 1 | 1 | 1 | 1 | 1 |
| | | TEGO Glide 440 | | | | | | | | | | |
| Others | Anionic surfactant | Emal 20 C | | 0.2 | 0.2 | 0.2 | 0.2 | 0.2 | 0.2 | 0.2 | 0.2 | 0.2 |
| Binder resin | | Binder Resin 1 | Nv30% | 20 | 20 | 20 | 20 | 20 | 20 | 20 | 20 | 20 |
| Pigment dispersion liquid | | | Nv18% | 30 | 30 | 30 | 30 | 30 | 30 | 30 | 30 | 30 |
| Other ingredient (preservative) | | Proxel GXL | | 0.05 | 0.05 | 0.05 | 0.05 | 0.05 | 0.05 | 0.05 | 0.05 | 0.05 |
| | | Total Amount | | 100 | 100 | 100 | 100 | 100 | 100 | 100 | 100 | 100 |
| Specs | The amount (% by mass) of [siloxane surfactant + acetylenediol surfactant (excluding (A1))] with regard to the amount of acetylenediol surfactant (A1) | | | 2125 | 850 | 340 | 85 | 28 | | | | |
| | The amount (% by mass) of acetylenediol surfactant (excluding (A1)) with regard to the amount of acetylenediol surfactant (A1) | | | 625 | 250 | 100 | 25 | 10 | | 8.3 | | |
| | Ratio of the contents, a content of alkanediol (B1) having 3 to 5 carbon atoms/a content of glycol ether (B2) having 4 to 10 carbon atoms | | | 4.0 | 4.0 | 4.0 | 4.0 | 4.0 | | | 4.0 | |
| | Energy (times amount) required to evaporate alkanediol (B1) having 3 to 5 carbon atoms with regard to energy required to evaporate glycol ether (B2) having 4 to 10 carbon atoms | | | 7.0 | 7.0 | 7.0 | 7.0 | 7.0 | | | 7.0 | |
| Evaluation Result | Evaluation 1: Beading | | | B | AA | AA | AA | | | A | | |
| | Evaluation 2: Blocking resistance | | | AA | AA | AA | B | | | B | | |
| | Evaluation 3: Ejection stability | | | A | AA | AA | A | | | B | | |
| | Example(Ex.)/Comparative Example(Com. Ex.) No. | | | | | | | | | | | |
| | Water-Based Inkjet Ink No. | | | 52 | 53 | 54 | 55 | 56 | 57 | 58 | 59 | 60 |
| Blend amount | Ion-exchanged water | | | 22.45 | 22.45 | 22.45 | 21.75 | 21.75 | 21.75 | 21.75 | 21.75 | 20.75 |
| | Water-soluble organic solvent (B) | Alkanediol (B1) having 3 to 5 carbon atoms | 1,2-PD, SP value = 13.5, b.p. = 188 | 20 | 20 | 20 | | | | | | |
| | | | 1,2-BD, SP value = 12.8, b.p. = 191 | | | | | | | | | |
| | | | 1,3-BD, SP value = 12.8, b.p. = 207 | | | | | | | | | |
| | | | 1,5-PentD, SP value = 12.4, b.p. = 239 | 5 | 5 | 5 | 5 | 5 | | | | |
| | | Glycol ether (B2) having 4 to 10 carbon atoms | EB, SP value = 10.8, b.p. = 171 | | | | | | 25 | | | |
| | | | PM, SP value = 11.3, b.p. = 121 | | | | | | | | 20 | 25 |
| | | | PE, SP value = 10.9, b.p. = 132 | | | | | | | | | |
| | | | PnP, SP value = 10.7, b.p. = 150 | | | | | | | | | |
| | | | PnB, SP value = 10.4, b.p. = 170 | | | | | | | | | |
| | | | MDG, SP value = 11.2, b.p. = 193 | | | | | | | | | 1 |
| | | | EDG, SP value = 10.9, b.p. = 202 | | | | | | | | | |
| | | | BDG, SP value = 10.5, b.p. = 231 | | | | | | | | | |
| | | | HDG, SP value = 10.2, b.p. = 258 | | | | | | | | | |
| | | | TEB, SP value = 10.3, b.p. = 278 | | | | | | | | | |

TABLE 3-continued

| | | | | | | | | | | | | | | |
|---|---|---|---|---|---|---|---|---|---|---|---|---|---|---|
| Surfactant (A) | Other water-soluble organic solvent | Gly DEG | SP value = 16.4 b.p. = 290<br>SP value = 15.0 b.p. = 244 | | | | 20 | 20 | | | | | | |
| | Acetylenediol surfactant (A1) | Acetylenediol Surfactant 1 having a structure of General Formula (1) | Mw = 563 HLB = 7.8 | | | | 1.5 | 1.5 | 1.5 | 1.5 | 1.5 | 1.5 | 1.5 | 1.5 |
| | | Acetylenediol Surfactant 2 | Mw = 605 HLB = 2.9 | | | | | | | | | | | |
| | | Acetylenediol Surfactant 3 | Mw = 591 HLB = 4.4 | | | | | | | | | | | |
| | | Acetylenediol Surfactant 4 | Mw = 577 HLB = 6.1 | | | | | | | | | | | |
| | | Acetylenediol Surfactant 5 | Mw = 549 HLB = 9.6 | | | | | | | | | | | |
| | | Acetylenediol Surfactant 6 | Mw = 417 HLB = 6.3 | | | | | | | | | | | |
| | | Acetylenediol Surfactant 7 | Mw = 723 HLB = 7.3 | | | | | | | | | | | |
| | | Acetylenediol Surfactant 8 | Mw = 1190 HLB = 7.4 | | | | | | | | | | | |
| | | Acetylenediol Surfactant 9 | Mw = 563 HLB = 7.8 | | | | | | | | | | | |
| | | Acetylenediol Surfactant 10 | Mw = 591 HLB = 7.5 | | | | | | | | | | | |
| | Nonionic surfactants (A2) | Acetylenediol Surfactant 11 (except (A1)) | Mw = 637 HLB = 11.1 | 1.5 | | | | | | | | | | |
| | | Surfynol 440 | Mw = 381 HLB = 8.1 | | 1.5 | | | | | | | | | |
| | | Surfynol 485 | Mw = 1548 HLB = 17.1 | | | 1.5 | | | | | | | | |
| | Siloxane surfactant | TEGO Wet 280 | | 1 | 1 | 1 | 1 | 1 | 1 | 1 | 1 | 1 | 1 | 1 |
| | | BYK-3420 | | | | | | | | | | | | |
| | | TEGO Glide 100 | | | | | | | | | | | | |
| | | TEGO Glide 440 | | | | | | | | | | | | |
| | Anionic surfactant | Emal 20 C | | | | 0.2 | 0.2 | 0.2 | 0.2 | 0.2 | 0.2 | 0.2 | 0.2 | 0.2 |
| Others | Binder resin | Binder Resin 1 | Nv30% | 20 | 20 | 20 | 20 | 20 | 20 | 20 | 20 | 20 | 20 |
| | Pigment dispersion liquid | Pigment dispersion liquid | Nv18% | 30 | 30 | 30 | 30 | 30 | 30 | 30 | 30 | 30 | 30 |
| | Other ingredient (preservative) | Proxel GXL | | 0.05 | 0.05 | 0.05 | 0.05 | 0.05 | 0.05 | 0.05 | 0.05 | 0.05 | 0.05 |
| | Total Amount | | | 100 | 100 | 100 | 100 | 100 | 100 | 100 | 100 | 100 | 100 |
| Specs | The amount (% by mass) of [siloxane surfactant + acetylenediol surfactant (A1)] with regard to the amount of acetylenediol surfactant (A1) | | | — | — | 113 | 113 | 113 | 113 | 113 | 113 | 113 | 113 |
| | The amount (% by mass) of acetylenediol surfactant (excluding (A1)) with regard to the amount of acetylenediol surfactant (A1) | | | — | — | 33 | 33 | 33 | 33 | 33 | 33 | 33 | 33 |
| | Ratio of the contents, a content of alkanediol (B1) having 3 to 5 carbon atoms/a content of glycol ether (B2) having 4 to 10 carbon atoms | | | 4.0 | 4.0 | 0 | 0 | 0 | 0 | 0 | — | 0.25 | 0 |
| | Energy (times amount) required to evaporate alkanediol (B1) having 3 to 5 carbon atoms with regard to energy required to evaporate glycol ether (B2) having 4 to 10 carbon atoms | | | 7.0 | 7.0 | 0 | 0 | 0 | 0 | 0 | — | 0.44 | 43.7 |
| Evaluation Result | Evaluation 1: Beading | | | D | D | D | C | D | D | D | D | D | D |
| | Evaluation 2: Blocking resistance | | | D | D | D | D | C | C | B | B | C | D |
| | Evaluation 3: Ejection stability | | | B | D | B | C | D | D | C | C | C | C |

The meanings of the abbreviations and the details of the trade names in Table 3 are as follows. In Table 3, "b. p." represents the boiling point in ° C., and "HLB" represents the HLB value.

1,2-PD: 1,2-propanediol (SP value: 13.5 $(cal/cm^3)^{1/2}$, Boiling point: 188° C., Specific heat: 0.57 cal/g·° C.)

1,2-BD: 1,2-butanediol (SP value: 12.8 $(cal/cm^3)^{1/2}$, Boiling point: 191° C., Specific heat: 0.559 cal/g·° C.)

1,3-BD: 1,3-butanediol (SP value: 12.8 $(cal/cm^3)^{1/2}$, Boiling point: 207° C., Specific heat: 0.559 cal/g·° C.)

1,5-PentD: 1,5-pentanediol (SP value: 12.4 $(cal/cm^3)^{1/2}$, Boiling point: 239° C., Specific heat: 0.526 cal/g·° C.)

Gly: Glycerin (SP value: 16.4 $(cal/cm^3)^{1/2}$, Boiling point: 290° C., Specific heat: 0.539 cal/g·° C.)

DEG: Diethylene glycol (SP value: 15.0 $(cal/cm^3)^{1/2}$, Boiling point: 244° C., Specific heat: 0.519 cal/g·° C.)

EB: Ethylene glycol monobutyl ether (SP value: 10.8 $(cal/cm^3)^{1/2}$, Boiling point: 171° C., Specific heat: 0.519 cal/g·° C.)

PM: Propylene glycol monomethyl ether (SP value: 11.3 $(cal/cm^3)^{1/2}$, Boiling point: 121° C., Specific heat: 0.557 cal/g·° C.)

PE: Propylene glycol monoethyl ether (SP value: 10.9 $(cal/cm^3)^{1/2}$, Boiling point: 132° C., Specific heat: 0.547 cal/g·° C.)

PnP: Propylene glycol monopropyl ether (SP value: 10.7 $(cal/cm^3)^{1/2}$, Boiling point: 150° C., Specific heat: 0.539 cal/cal/g·° C.)

PnB: Propylene glycol monobutyl ether (SP value: 10.4 $(cal/cm^3)^{1/2}$, Boiling point: 170° C., Specific heat: 0.533 cal/g·° C.)

MDG: Diethylene glycol monomethyl ether (SP value: 11.2 $(cal/cm^3)^{1/2}$, Boiling point: 193° C., Specific heat: 0.513 cal/g·° C.)

EDG: Diethylene glycol monoethyl ether (SP value: 10.9 $(cal/cm^3)^{1/2}$, Boiling point: 202° C., Specific heat: 0.510 cal/g·° C.)

BDG: Diethylene glycol monobutyl ether (SP value: 10.5 $(cal/cm^3)^{1/2}$, Boiling point: 231° C., Specific heat: 0.505 cal/g·° C.)

HDG: Diethylene glycol monohexyl ether (SP value: 10.2 $(cal/cm^3)^{1/2}$, Boiling point: 258° C., Specific heat: 0.501 cal/g·° C.)

TEB: Triethylene glycol monobutyl ether (SP value: 10.3 $(cal/cm^3)^{1/2}$, Boiling point: 278° C., Specific heat: 0.497 cal/g·° C.)

Surfynol 440: Acetylenediol surfactant (in general formula (1), a compound in which $R^1$ is a methyl group, $R^2$ is an isobutyl group, m1+n1 is 3 to 4, and m2+n2 is 0, and HLB value is 8.1 (average value)) manufactured by Evonik Japan Co., Ltd.

Surfynol 485: Acetylenediol surfactant (in general formula (1), a compound in which $R^1$ is a methyl group, $R^2$ is an isobutyl group, m1+n1 is 30, and m2+n2 is 0, and HLB value is 17.1) manufactured by Evonik Japan Co., Ltd.

TEGO Wet 280: Siloxane surfactant manufactured by Evonik Japan Co., Ltd.

BYK-3420: Siloxane surfactant manufactured by BYK Japan KK

TEGO Glide 100: Siloxane surfactant manufactured by Evonik Japan Co., Ltd.

TEGO Glide 440: Siloxane surfactant manufactured by Evonik Japan Co., Ltd.

EMAL 20C: Aqueous solution of polyoxyethylene (3) sodium lauryl ether sulfate (25% solid content, anionic surfactant manufactured by Kao Corporation)

PROXEL GXL: Dipropylene glycol aqueous solution of 1,2 benzoisothiazole-3-one (1,2-Benzisothiazole-3-one:dipropylene glycol:water=2:6:2, antiseptic manufactured by Arch Chemicals, Inc.)

<Preparation of Printed Matter>

An inkjet printing device was prepared in which an inkjet head "KJ4B-1200" (design resolution 1,200 dpi, nozzle diameter 20 µm) manufactured by Kyocera Corporation was installed above a conveyor, and the inkjet head was filled with the water-based inkjet ink described in Table 2. An OPP film cut out in advance into A4 size (width of 21 cm and length of 30 cm) was fixed on the conveyor as a printing substrate. Then, the conveyor was driven at a speed of 50 m/min, and when the printing substrate passed under the installation part of the inkjet head, the water-based inkjet ink was ejected under the condition of a drop volume of 2 pL, and an image was printed. Then immediately, the printing substrate after printing was put into an air-blowing constant temperature incubator set at 70° C., and dried for 1 minute to produce printed matter.

The following two kinds of printed matter were produced by the method described above. The following two kinds of printed matter were produced for each of the water-based inkjet inks:

Solid printed matter printed matter having a coverage rate of 100% (a width of 15 cm and a length of 30 cm)

Gradation printed matter: printed matter having a gradation image having a coverage rate continuously changed between 5 to 80% and printed in a range of a width of 10 cm and a length of 30 cm.

Examples 1 to 51, Comparative Examples 1 to 9

Evaluations 1 and 2 in the following description were performed using the printed matter produced by the method described above. Evaluation 3 was performed using the water-based inkjet ink described above. The results of these evaluations are shown in Table 3.

<Evaluation 1: Evaluation of Beading>

Beading was evaluated by visually observing the gradation printed matter produced by the method described above and confirming the coverage rate of the part where the uneven gradation began to be observed. The evaluation criteria were as follows, and "C" rating or higher was considered to be practically usable.

(Evaluation Criteria)

AA: No uneven gradation was observed even at 90% coverage rate.

A: No uneven gradation was observed at 80% coverage rate, but uneven gradation was observed at 70% coverage rate.

B: No uneven gradation was observed at 70% coverage rate, but uneven gradation was observed at 80% coverage rate.

C: No uneven gradation was observed at 60% coverage rate, but uneven gradation was observed at 70% coverage rate.

D: Uneven gradation was observed at 60% coverage rate.

<Evaluation 2: Evaluation of Blocking Resistance>

After the solid printed matter produced by the method described above was cut into 4 cm squares, a printed surface and a non-printed surface of the same printing substrate (OPP film) used for printing were overlapped. Next, the overlapped material was used as a test piece, and a blocking test was performed using a constant load type permanent strain tester ("CO-201" manufactured by Tester Sangyo Co. Ltd.). The conditions for the blocking test were a load of 10 kg/cm², an environmental temperature of 40° C., an environmental humidity of 80% RH, and a standing time of 36 hours. After 24 hours, the test piece was taken out of the constant load type permanent strain tester, and the overlapped printing substrate was peeled off rapidly while keeping an angle of 90 degrees. Then, the blocking resistance was evaluated from the feeling when peeled off (peeling resistance) and the appearance of the printed surface after peeling off (visual check). The evaluation criteria were as follows, and a rating of "B" or higher was considered to be practically usable.

(Evaluation Criteria)
- AA: There was no peeling resistance, and a part of the water-based inkjet ink layer did not adhere to the non-printing surface of the printing substrate.
- A: Although there was slight resistance during peeling, a part of the water-based inkjet ink layer did not adhere to the non-printing surface of the printing substrate.
- B: A part of the water-based inkjet ink layer adhered to the non-printing surface of the printing substrate, and the extent of the adhesion was 10% or less in the area of the overlapped part.
- C: A part of the water-based inkjet ink layer adhered to the non-printing surface of the printing substrate, and the extent of the adhesion was over 10% and 30% or less in the area of the overlapped part.
- D: A part of the water-based inkjet ink layer adhered to the non-printing surface of the printing substrate, and the extent of the adhesion was over 30% in the area of the overlapped part.

<Evaluation 3: Evaluation of Ejection Stability>

The inkjet printing device used for producing printed matter was filled with the water-based inkjet ink described in Table 2. After the nozzle check pattern was printed and it was confirmed that there was no nozzle failure, 300 sheets of solid printed matter were produced by the method described above. Then, the nozzle check pattern was printed again and the ejection stability was evaluated by visually counting the number of nozzle failure. The evaluation criteria were as follows. A rating of "B" or higher was considered to be practically usable.

(Evaluation Criteria)
- AA: Nozzle failures did not occur at all.
- A: 1 to 9 nozzle failures occurred.
- B: 10 to 19 nozzle failures occurred.
- C: 20 to 49 or more nozzle failures occurred.
- D: 50 or more nozzle failures occurred.

As shown in Table 3, the water-based inkjet inks in Examples 1 to 51 having the configuration of the present invention was superior in ejection stability as compared with the ink in Comparative Examples 1 to 9. The printed matter was superior in suppression of beading (image quality) and anti-blocking.

The invention claimed is:

1. A water-based inkjet ink comprising a pigment, a surfactant (A), and a water-soluble organic solvent (B), wherein the surfactant (A) includes an acetylenediol surfactant (A1) and a nonionic surfactant (A2) other than the acetylenediol surfactant (A1), wherein the acetylenediol surfactant (A1) has a structure represented by General Formula (1) described below, and an HLB value of 10 or less, the nonionic surfactant (A2) includes an acetylenediol surfactant different from the acetylenediol surfactant (A1) and a siloxane surfactant, wherein a sum of a content of the siloxane surfactant and a content of the acetylenediol surfactant different from the acetylenediol surfactant (A1) ranges from 20 to 850% by mass relative to the content of the acetylenediol surfactant (A1);

the water-soluble organic solvent (B) includes an alkanediol (B1) having 3 to 5 carbon atoms, and a glycol monoether (B2) having 4 to 10 carbon atoms;

a mass ratio ((B1)/(B2)) between a content of the alkanediol (B1) having 3 to 5 carbon atoms and a content of the glycol monoether (B2) having 4 to 10 carbon atoms is 0.8 to 12, and an energy required to evaporate the alkanediol (B1) having 3 to 5 carbon atoms is 2.5 to 16 times an energy required to evaporate the glycol monoether (B2) having 4 to 10 carbon atoms, General formula (1):

[Chemical 1]

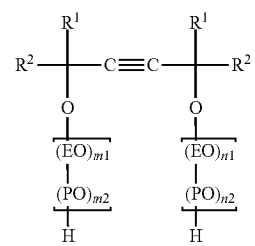

in General Formula (1), each of $R^1$ and $R^2$ represents an alkyl group having 1 to 5 carbon atoms, which may have branches, EO represents an ethylene oxide group, and PO represents a propylene oxide group; each of m1, m2, n1 and n2 represents an integer of 1 to 10, and (m1+n1):(m2+n2)=1:9 to 9:1; and the addition forms of ethylene oxide groups and propylene oxide groups in brackets may be block type or random type.

2. The water-based inkjet ink according to claim 1, wherein a content of the acetylenediol surfactant (A1) is 0.1 to 5.0% by mass of the total amount of the water-based inkjet ink.

3. A printed matter obtained by printing the water-based inkjet ink according to claim 1.

* * * * *